(12) United States Patent
Thayumanavan et al.

(10) Patent No.: US 8,519,074 B2
(45) Date of Patent: Aug. 27, 2013

(54) COMB POLYMERS FOR SUPRAMOLECULAR NANOCONFINEMENT

(75) Inventors: Sankaran Thayumanavan, Amherst, MA (US); Mark Tuominen, Shutesbury, MA (US); Ryan Hayward, Northampton, MA (US)

(73) Assignee: The University of Massachusettes, Boston, MA (US)

( * ) Notice: Subject to any disclaimer, the term of this patent is extended or adjusted under 35 U.S.C. 154(b) by 156 days.

(21) Appl. No.: 12/974,042

(22) Filed: Dec. 21, 2010

(65) Prior Publication Data

US 2011/0178190 A1    Jul. 21, 2011

Related U.S. Application Data

(60) Provisional application No. 61/295,382, filed on Jan. 15, 2010.

(51) Int. Cl.
*C08F 26/06* (2006.01)
*H01M 2/16* (2006.01)

(52) U.S. Cl.
USPC .......... 526/261; 526/259; 528/423; 548/255; 548/257; 548/304.4; 548/335.1; 429/492

(58) Field of Classification Search
USPC .......... 526/259, 261; 528/423; 548/255, 548/257, 304.4, 335.1; 429/492
See application file for complete search history.

(56) References Cited

U.S. PATENT DOCUMENTS

| | | | |
|---|---|---|---|
| 2006/0111530 A1* | 5/2006 | Li et al. | 526/258 |
| 2007/0248889 A1* | 10/2007 | Schmidt et al. | 429/309 |
| 2007/0293669 A1* | 12/2007 | Thayumanavan | 544/235 |
| 2008/0152985 A1* | 6/2008 | Li et al. | 429/33 |
| 2008/0230514 A1 | 9/2008 | Park et al. | |
| 2010/0075116 A1 | 3/2010 | Russell et al. | |
| 2010/0086801 A1 | 4/2010 | Russell et al. | |
| 2010/0112308 A1 | 5/2010 | Russell et al. | |

OTHER PUBLICATIONS

W. Li, A. Manthiram, and M.D. Guiver, "Acid-base blend membranes consisting of sulfonated poly(ether ether ketone) and 5-aminobenzotriazole tethered polysulfone for DMFC", J. Membrane Sci. 2010, 362(1-2), 289-297.*

S. Sanghi, M. Tuominen, and E. B. Coughlin, "Hybrid inorganic-organic proton exchange membranes containing 1H-1,2,3-triazole moieties", Solid State Ionics 2010, 181(25-26), 1183-1188.*

C. Nagamani, C. Versek, M. Thorn, M. T. Tuominen, and S. Thayumanavan, "Proton Conduction in 1H-1,2,3-triazole Polymers: Imidazole-Like or Pyrazole-Like?", J. Polym. Sci., Part A: Polym. Chem. 2010, 48(9), 1851-1858.*

(Continued)

*Primary Examiner* — Richard A Huhn
(74) *Attorney, Agent, or Firm* — Cantor Colburn LLP

(57) ABSTRACT

Polymers including pendent hydrophobic groups and pendent proton transfer groups are shown to form nanostructured films exhibiting greatly increased proton conductivity compared with films prepared from corresponding polymers lacking hydrophobic groups. The polymers can include repeating units each of which has both a hydrophobic group and a proton transfer group. Alternatively, the polymers can be the product of copolymerizing a first monomer with at least one hydrophobic group and a second monomer with at least one proton transfer group. The polymers are useful for the preparation of fuel cell proton exchange membranes.

15 Claims, 14 Drawing Sheets

(56) References Cited

OTHER PUBLICATIONS

S. Martwiset, R. C. Woudenberg, S. Granados-Focil, O. Yavuzcetin, M. T. Tuominen, E. b. Coughlin, "Intrinsically conducting polymers and copolymers containing triazole moieties", Solid State Ionics 2007, 178(23-24), 1398-1403.*

J. Keck, G. J. Stuber, and H. E. A. Kramer, "Deactivation Processes of 2-hydrophenyl-1,3,5-triazines—Polymeric and Monomeric UV Absorbers of the Benzotriazole and Triazine Class", Angewandte Makromolekulare Chemie 1997, 252, 119-138.*

Basu et al., "Homopolymers Micelles in Heterogeneous Solvent Mixtures", J. Am. Chem. Soc. 127, 2005, p. 16794-16795.

Bozkurt et al., "Proton conducting blends of poly(4-vinylimidazole) with phosphoric acid", Solid State Ionics, 2001, 138, p. 259-265.

Carrette et al., "Fuel cells-fundamentals and applications", Fuel Cells, 1, p. 5-39, 2001.

Cho et al., "Mesophase structure—mechanical and ionic transport correlations in extended amphilphilic dendrons", Science, vol. 305, Sep. 10, 2004, p. 1598-1601.

Diat et al., "Proton Channels", Nat. Mater. 7, 2008, p. 13-14.

Elliot et al., "Interpretation of the small-angle x-ray scattering from swollen and oriented perfluorinated ionomer members", Macromolecules 33, 2000, p. 8708-8713.

Granados-Focil et al., "Water-free proton-conducting polysiloxanes: A study on the effect of heterocycle structure", Macromolecules, 40, p. 8708-8713, 2007.

Herz et al., "New fully polymeric proton solvents with high proton mobility", Electrochim. Acta, 2003, 48, p. 2165-2171.

Hickner et al., "Alternative polymer systems for proton exchange membranes (PEMs)", Chem. Rev., 2004, 104, p. 4587-4612.

Kreuer, "Proton conductivity: Materials and applications", Chem. Mater., 1996, 8, p. 610-641.

Kreuer, "A phenomenon between the solid and the liquid state?", Solid State Ionics, 94, p. 55-62, 1997.

Kreuer et al., "Imidzaole and pyrazole-based prton conducting polymers and liquids", Electrochimica Acta, 1998, 43, (10-11), p. 1281-1288.

Li et al., "Approaches and recent development of polymer electrolyte membranes for fuel cells operating above 100 C", Chem. Mater. 15, 2003, p. 4896-4915.

Mauritz et al., "State of understanding of Nafion", Chem. Rev., 2004, 104, p. 4535-4585.

Park et al., "Design, fabrication, and initial testing of a minature PEM fuel cell with micro-scale pyrolyzed carbon fluidic plates", Journal of Power Sources 162, 2006, p. 369-379.

Persson et al., "Intrinsically Proton-Conducting Benzimidazole Units Thethered to Polysiloxanes", Macromolecules, 2005, 28, p. 3283-3289.

Rikukawa et al., "Proton-conducting polymer electrolyte membranes based on hydrocarbon polymers", Prog. Polym. Sci., 25, 2000, p. 1463-1502.

Roy et al., "Influence of chemical composition and sequence length on the transport properties of proton exchange membranes", J. Polym Sci Part B: Polym Phys. 44, 2006, p. 2226-2239.

Rubatat et al., "Structrual study of proton-conducting fluorous block copolymer membranes", Macromolecules, 2006, 39, p. 720-730.

Ruotsalainen et al., "Structural Hierarchy in flow-aligned hexagonally self-organized microphases with parallel polyelectrolytic structures", Macromolecules, 2003, 36, p. 9437-9442.

Sanders et al., "Characterization of electrosprayed Nafion films", Journal of Power Sources 129, 2004, p. 55-61.

Sass et al., "Structural alterations for proton translocation in the M state of wild-type bacteriorhodopsin", Nature, 2000, 406, p. 649-653.

Savariar et al., "Supramolecular Assemblies from Amphiphilic Homopolymers: Testing the Scope", J. Am. Chem. Soc., 2006, 128, p. 16224-16230.

Scharfenberger et al., "Anhydrous polymeric proton conductors based on imidazole functionalized polysiloxane", Fuel Cells, 6, p. 237-250, 2006.

Schmidt-Rohr et al., "Parallel cylindrical water nanochannels in Nafion fuel-cell memebranes", Nature Materials, vol. 7, p. 75-83, 2008.

Schnell et al., "Structure and mechanism of the M2 proton channel of influenza A virus", Nature 451, 2000, p. 591-560.

Schuster et al., "Anhydrous proton-conducting polymers", Annu. Rev. Mater. Res. 33, 2003, p. 233-261.

Shi et al., "Synthesis and Proton Conductivity of Partially Sulfonated Poly([vinylidene difluoride-co-hexafluoropropylene]-b-styrene) Block Copolymers", Macromolecules 38, 2005, p. 4193-4201.

Shogbon et al., "Determination of the molecular parameters and studies of the chain conformation of polybenzimidazole in DMAc/LiCl", Macromolecules, 39, p. 9409-9418, 2006.

Steele et al., "Materials for fuel-cell technologies", Nature, vo. 414, Nov. 15, 2001, p. 345-352.

Stouffer et al., "Structural basis for the function and inhibition of an influenza virus proton channel", Nature 451, 2008, p. 596-600.

Subbaraman et al., "4,5-Dicyano-1H-[1,2,3]-triazole as a proton transport facilitator for polymer electrolyte membrane fuel cells", J. Am. Chem. Soc., 129, p. 2238-2239, 2007.

Vutukrui et al., "Dendrimers with Both Polar and Apolar Nanocontainer Characteristics", J. Am. Chem. Soc., 2004, 126, p. 15636-15637.

Williams, "Proton circuits in biological energy interconversions", Annu. Rev. Biophys., Biophys. Chem., 1988, 17, 71-97.

Wintersgill et al., "Complex impedance measurements on Nafion", Electrochim. Acta, vol. 43, 1998, No. 10-11, p. 1533-1538.

Yang et al., "Approaches and technical challenges to high temperature operation of proton exchange membrane fuel cells", Journal of Power Sources, 2001, 103, p. 1-9.

Zhou et al., "Promotion of Prton Conductions in Polymer Electrolyte Membranes by 1H-1, 2, 3-triazole", J. Am. Chem. Soc. 127, 2005, p. 10824-10825.

* cited by examiner

US 8,519,074 B2

COMB POLYMERS FOR SUPRAMOLECULAR NANOCONFINEMENT

CROSS REFERENCE TO RELATED APPLICATION

This application claims the benefit of U.S. Provisional Patent Application Ser. No. 61/295,382, filed Jan. 15, 2010, which is fully incorporated herein by reference.

STATEMENT REGARDING FEDERALLY SPONSORED RESEARCH & DEVELOPMENT

The U.S. Government has certain rights in this invention pursuant to National Science Foundation Grant No. CHE-0739227.

BACKGROUND OF THE INVENTION

Efficient and selective transport of protons is critical in biological contexts (see, e.g., Williams, R. J. P., "Proton circuits in biological energy interconversions", *Annu. Rev. Biophys., Biophys. Chem.* 17, 71-97 (1988)) as well as in fuel cell membranes, which are important device components in the quest to move to clean energy sources. K. D. Kreuer, "Proton conductivity: Materials and applications", *Chem. Mater.* 8, 610-641 (1996). In biological systems, nature has optimized proton conduction over nanometer-scale dimensions by using secondary and tertiary structures of proteins to precisely arrange appropriate side chains of amino acids, for example in the membrane protein, M2. See, e.g., H. J. Sass, G. Büldt, R. Gessenich, D. Helm, D. Neff; R. Schlesinger, J. Berendzen, and P. Ormos, "Structural alterations for proton translocation in the M state of wild-type bacteriorhodopsin", *Nature* 406, 649-653 (2000); J. R. Schnell and J. M. Chou, "Structure and mechanism of the M2 proton channel of influenza A virus", *Nature* 451, 591-560 (2008); and A. L. Stouffer, R. Acharya, D. Salom, A. S. Levine, L. Di Costanzo, C. S. Soto, V. Tereshko, V. Nanda, S. Stayrook, and W. F. DeGrado, "Structural basis for the function and inhibition of an influenza virus proton channel", *Nature* 451, 596-600 (2008). While controlling proton transfer over nanometer length-scales is adequate for most biological processes, it is essential that efficient proton conduction be obtained over micron length scales for clean energy applications. See, e.g., L. Carrette, K. A. Friedrich, and U. Stimming, "Fuel cells-fundamentals and applications", *Fuel Cells* 1, 5-39 (2001); and B. C. H. Steele and A. Heinzel, "Materials for fuel-cell technologies", *Nature* 414, 345-352 (2001). For example in hydrogen fuel cells, following oxidation of molecular hydrogen at the anode, the resulting protons must be transported across a selective membrane in order to reach the cathode and complete the conversion of chemical energy to electrical energy. The proton conductivity of this membrane, often called the proton exchange membrane or the polymer electrolyte membrane (PEM), has been one of the bottlenecks to achieving affordable fuel cell technology. Nafion, a poly(tetrafluoroethylene) based polymer with sulfonic acid groups arranged at random intervals along the backbone, is one of the most widely used materials for this membrane. K. A. Mauritz and R. B. Moore, "State of understanding of Nafion", *Chem. Rev.* 104, 4535-4585 (2004). The key to proton transport in Nafion is thought to be nanochannels of sulfonic acid groups, through which "hydrated" protons can pass efficiently. See, e.g., O. Diat and G. Gebel, "Proton channels", *Nat. Mater.* 7, 13-14 (2008); K. Schmidt-Rohr and Q. Chen, "Parallel cylindrical water nanochannels in Nafion fuel-cell membranes", *Nat. Mater.* 7, 75-83 (2008); and J. A. Elliott, S. Hanna, A. M. S. Elliott, and G. E. Cooley, "Interpretation of the small-angle x-ray scattering from swollen and oriented perfluorinated ionomer membranes", *Macromolecules* 33, 8708-8713 (2000). Although a good proton conductor for hydrated protons, Nafion suffers from poor conductivity in unassisted proton transfer, i.e., Grotthuss or anhydrous proton transfer, resulting in low conductivities at temperatures above the boiling point of water. M. A. Hickner, H. Ghassemi, Y. S. Kim, B. R. Einsla, and J. E. McGrath, "Alternative polymer systems for proton exchange membranes (PEMs)", *Chem. Rev.* 104, 4587-4612 (2004); and M. Rikukawa, and K. Sanui, "Proton-conducting polymer electrolyte membranes based on hydrocarbon polymers", *Prog. Polym. Sci.* 25, 1463-1502 (2000). Polymer electrolyte membranes with high proton conductivities at temperatures of 120-200° C. are desirable, since operating at higher temperatures can increase fuel cell efficiency, lower cost, simplify heat management, and provide better tolerance of the catalysts against poisoning. Q. Li, R. He, J. O. Jensen, and N. J. Bjerrum, "Approaches and recent development of polymer electrolyte membranes for fuel cells operating above 100° C.", *Chem. Mater.* 15, 4896-4915 (2003). One approach to address this issue is to employ amphoteric functional groups that allow anhydrous proton transport. See, e.g., K. D. Kreuer, "A phenomenon between the solid and the liquid state?", *Solid State Ionics* 94, 55-62 (1997); and K. D. Kreuer, A. Fuchs, M. Ise, M. Spaeth, and J. Maier, "Imidazole and pyrazole-based proton conducting polymers and liquids", *Electrochim. Acta.* 43, 1281-1288 (1998). Such amphoteric functional groups include imidazole, which is a common motif in biological proton transport in the form of the amino acid histidine. Synthetic polymers containing such amphoteric functional groups have been studied as candidates for high-temperature proton transfer by several groups. See, e.g., G. Scharfenberger, W. H. Meyer, G. Wegner, M. Schuster, K. D. Kreuer, and J. Maier, "Anhydrous polymeric proton conductors based on imidazole functionalized polysiloxane", *Fuel Cells* 6, 237-250. (2006); Z. Zhou, S. W. Li, Y. L. Zhang, M. L. Liu, and W. Li, "Promotion of proton conduction in polymer electrolyte membranes by 1H-1,2,3-triazole", *J. Am. Chem. Soc.* 127, 10824-10825 (2005); S. Granados-Focil, R. C. Woudenberg, O. Yavuzcetin, M. T. Tuominen, and E. B. Coughlin, "Water-free proton-conducting polysiloxanes: A study on the effect of heterocycle structure", *Macromolecules* 40, 8708-8713 (2007); J. C. Persson, P. Jannasch, "Intrinsically proton-conducting benzimidazole units tethered to polysiloxanes", *Macromolecules* 38, 3283-3289 (2005); C. B. Shogbon, J.-L. Brousseau, H. Zhang, B. C. Benicewicz, and Y. Akpalu, "Determination of the molecular parameters and studies of the chain conformation of polybenzimidazole in DMAc/LiCl", *Macromolecules* 39, 9409-9418 (2006); R. Subbaraman, H. Ghassemi, and T. A. Zawodzinski Jr., "4,5-Dicyano-1H-[1,2,3]-triazole as a proton transport facilitator for polymer electrolyte membrane fuel cells", *J. Am. Chem. Soc.* 129, 2238-2239 (2007).

While a number of interesting candidate materials have been identified, there remains a need for materials exhibiting improved anhydrous proton-conduction.

BRIEF DESCRIPTION OF THE INVENTION

One embodiment is a polymer, comprising: a plurality of repeating units; wherein each repeating unit comprises a pendent hydrophobic group, and a pendent proton transfer group bound to the repeating unit via a linking group.

Another embodiment is a random copolymer, comprising: a plurality of first repeating units having the structure

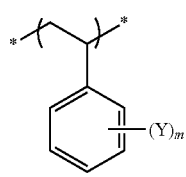

wherein m is 1 or 2; and Y is a hydrophobic group selected from the group consisting of $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl; and a plurality of second repeating units having the structure

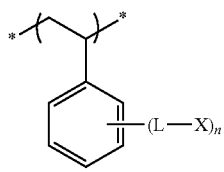

wherein n is 1 or 2; L is a linking group comprising about 3 to about 10 aliphatic carbon atoms; and X is a proton transfer group selected from the group consisting of hydroxyl,

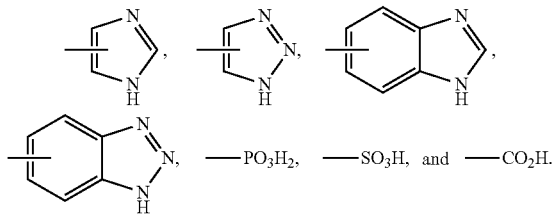

Other embodiments include proton exchange membranes comprising the polymers and/or copolymers described herein, as well as fuel cells comprising the proton exchange membranes.

Another embodiment is a method of increasing the efficiency of proton transport in a proton exchange membrane, comprising: conducting protons through an ordered array of phase-separated nanochannels in a polymeric material; wherein the phase-separated nanochannels have an average width of about 0.5 to about 5 nanometers and an average length of at least 20 nanometers; and wherein the phase-separated nanochannels comprise about 5 to about 20 millimoles per centimeter$^3$ of the proton-conducting group.

These and other embodiments are described in detail below.

DETAILED DESCRIPTION OF THE INVENTION

Figure 1:
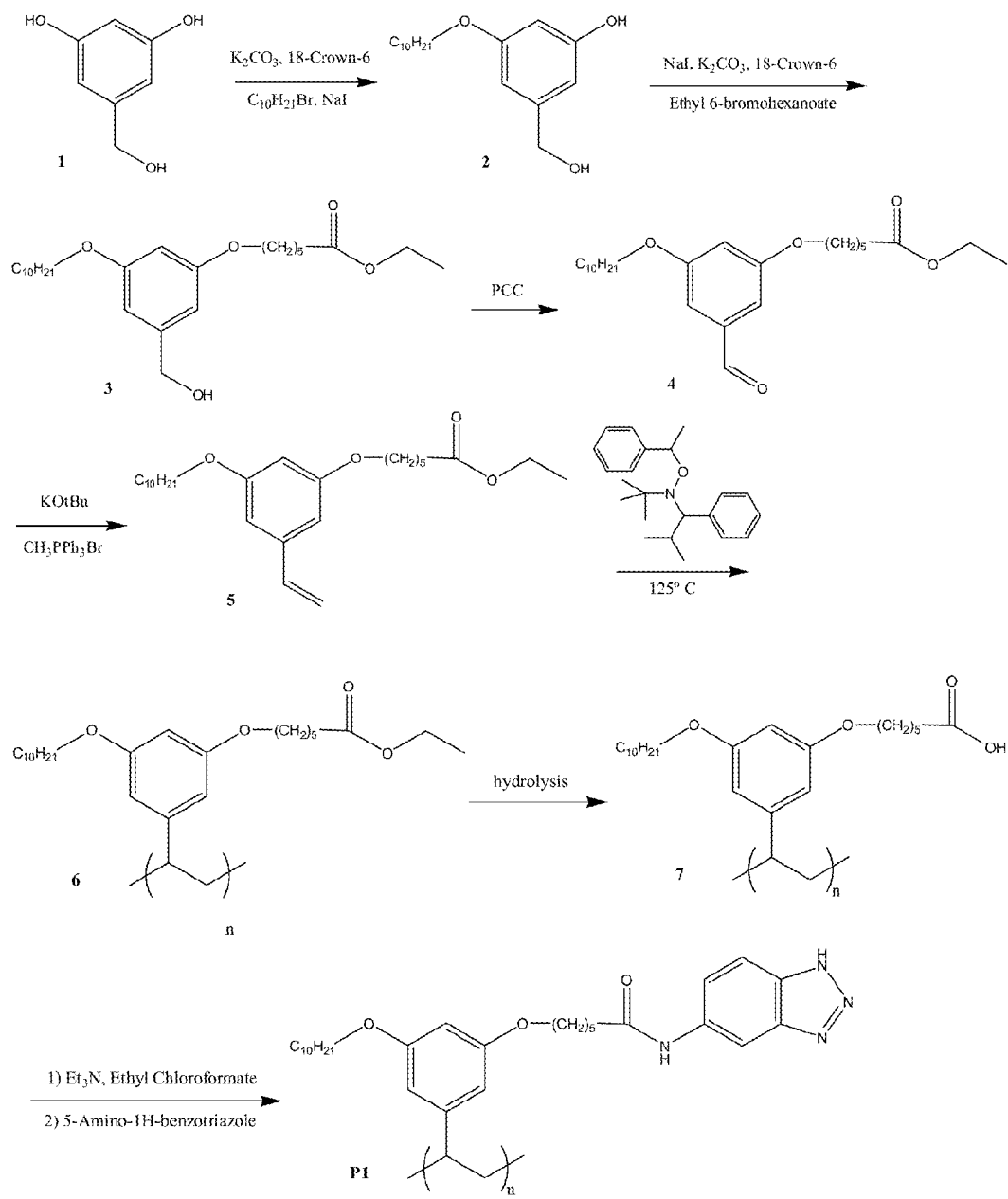
FIG. 1 is a synthetic scheme for the synthesis of polymer P1.

Described herein are the molecular design and synthesis of a class of comb polymers bearing hydrophobic groups and amphoteric proton transfer groups. The comb polymers can self-assemble into organized supramolecular structures comprising nano-phase separated domains. Omission of the hydrophobic groups from the comb polymer structure results in polymers that lack such nanoscale organization. Comparisons between the polymers with and without hydrophobic groups reveal that the self-assembled structures of the hydrophobic group-containing polymers yield dramatically increased proton conductivities (by as much as three orders of magnitude), presumably due to a locally-increased concentration of proton-transport functionalities within the nano-phase separated domains.

A variety of polymer architectures yield the desired nano-phase separation. A common theme among the various architectures is proximity of proton transfer groups to each other, proximity of hydrophobic groups to each other, and proximity of proton transfer groups to hydrophobic groups. This can be achieved by including at least one proton transfer group and at least one hydrophobic group in each repeating unit of the polymer. It can also be achieved by random copolymerization of a hydrophobic group-containing monomer with a proton transfer group-containing monomer.

In some embodiments, the polymer comprises at least one hydrophobic group and at least one proton transfer group on each repeating unit. Thus, one embodiment is a polymer comprising a plurality of repeating units, wherein each repeating unit comprises a pendent (i.e., monovalent) hydrophobic group, and a pendent (i.e., monovalent) proton transfer group. The proton transfer group is bound to the remainder of the repeating unit via a linking group that is typically divalent.

The pendent hydrophobic group typically comprises about 5 to about 20 carbon atoms and can be, for example, a hydrocarbon group, a fluorocarbon group, or a partially fluorinated hydrocarbon group. Examples of pendent hydrophobic groups include $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it may, optionally, contain heteroatoms over and above the carbon and hydrogen members of the substituent residue. Thus, when specifically described as substituted, the hydrocarbyl residue may also comprise one or more substituents such as halogen (including fluorine, chlorine, bromine, and iodine), carboxylic acid groups, amino groups, hydroxyl groups, or the like, or it may contain divalent heteroatoms-containing groups such as oxygen atoms, silicon atoms, and carbonyl groups within the backbone of the hydrocarbyl residue. When the polymer is used in the fabrication of a proton exchange membrane, it can be preferred to use a $C_5$-$C_{20}$ perfluorinated hydrocarbyl group because of the resistance of such groups to oxidation.

The pendent proton transfer group is a group capable of facilitating the transfer of protons within a material comprising the polymer. In some embodiments, the proton transfer group can be a Bronsted acid or a Bronsted base. Specific examples of proton transfer groups include hydroxyl (—OH),

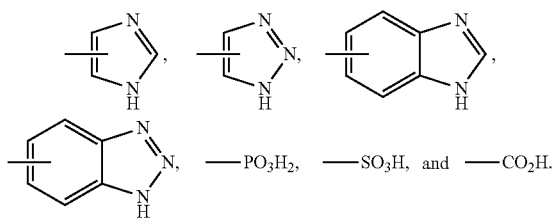

as well as the conjugate acids and bases thereof. In some embodiments, the pendent proton transfer group is

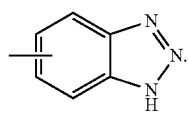

The proton transfer group is joined to the remainder of the repeating unit via a linking group. The function of the linking group is to provide some flexibility in the orientation of the proton transfer group. In some embodiments, the linking group is a divalent group comprising about 3 to about 10 aliphatic carbon atoms. The linking group can include heteroatoms in the form of ether oxygen atoms, carbonyl oxygen atoms, amide nitrogen atoms, thioether sulfur atoms, and the like. Specific examples of linking groups include, for example, —$(CH_2)_{5-10}$—, —$(CH_2)_{5-10}$O—, —$(CH_2)_{5-10}$S—, —C(=O)$(CH_2)_{3-9}$—, —C(=O)$(CH_2)_{3-9}$O—, —NH$(CH_2)_{3-9}$—, —NH$(CH_2)_{3-9}$O—, —NHC(=O)$(CH_2)_{3-9}$—, —NHC(=O)$(CH_2)_{3-9}$O—, —C(=O)NH$(CH_2)_{3-9}$—, —C(=O)NH$(CH_2)_{3-9}$O—, and the like, wherein either end of the linking group can be attached to the proton transfer group.

One advantage of the present invention is that it can utilize a wide variety of polymer backbones. As used herein, the term "polymer backbone" refers to the portion of the polymer other than the pendent hydrophobic groups, the pendent proton transfer groups, and the linking groups. Suitable polymer backbones include, for example, polystyrenes, polysilanes, polysiloxanes, poly(phenylene ether)s, poly(phenylene sulfide)s, polyketones, polyetherketones, polysulfones, polyethersulfones, polyquinoxalines, polyimides, polyetherimides, polyurethanes, and polyureas.

In some embodiments, the polymer backbone is a polystyrene. For example, the repeating units can have the structure

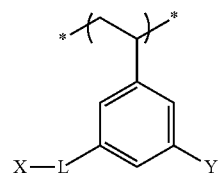

wherein X is the pendent proton transfer group, L is the linking group, and Y is the pendent hydrophobic group. Any of the hydrophobic groups, linking groups, and proton transfer groups described above can be employed in these embodiments. There is no particular limitation on the tacticity of the polystyrene. It can be atactic, syndiotactic, or isotactic.

In a specific embodiment demonstrated in the working examples below, the repeating units have the structure

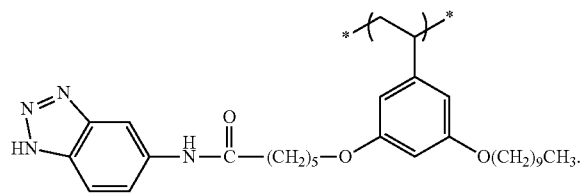

In this embodiment, the polymer backbone is polystyrene, the hydrophobic group is —O$(CH_2)_9CH_3$, the linking group is —NH—C(O)—$(CH_2)_5$—O—, and the proton transfer group is

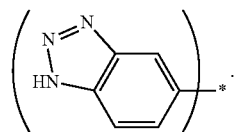

In another specific embodiment demonstrated in the working examples below, the repeating units have the structure

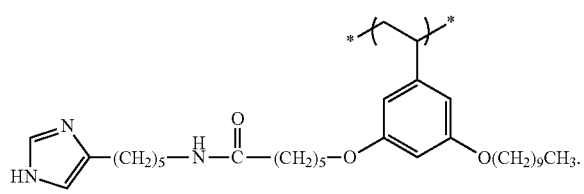

In this embodiment, the polymer backbone is polystyrene, the hydrophobic group is —O$(CH_2)_9CH_3$, the linking group is —$(CH_2)_2$—NH—C(O)—$(CH_2)_5$—O—, and the proton transfer group is

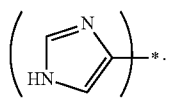

In some embodiments, the polymer backbone is a polysilane or polysiloxane. For example, the repeating units can have the structure

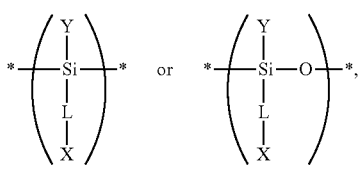

wherein X is the pendent proton transfer group, L is the linking group, and Y is the pendent hydrophobic group. Any of the hydrophobic groups, linking groups, and proton transfer groups described above can be employed in these embodiments. Polysilanes and polysiloxanes can both be prepared from dichlorosilanes. Polysilanes can be obtained through a reductive coupling of dichlorosilanes, whereas polysiloxanes can be obtained through a condensation reaction of dichlorosilanes or dialkoxysilanes in the presence of catalytic amount of acid or base.

In some embodiments, the polymer backbone is a polyetherketone or polyethersulfone. For example, the repeating units can have the structure

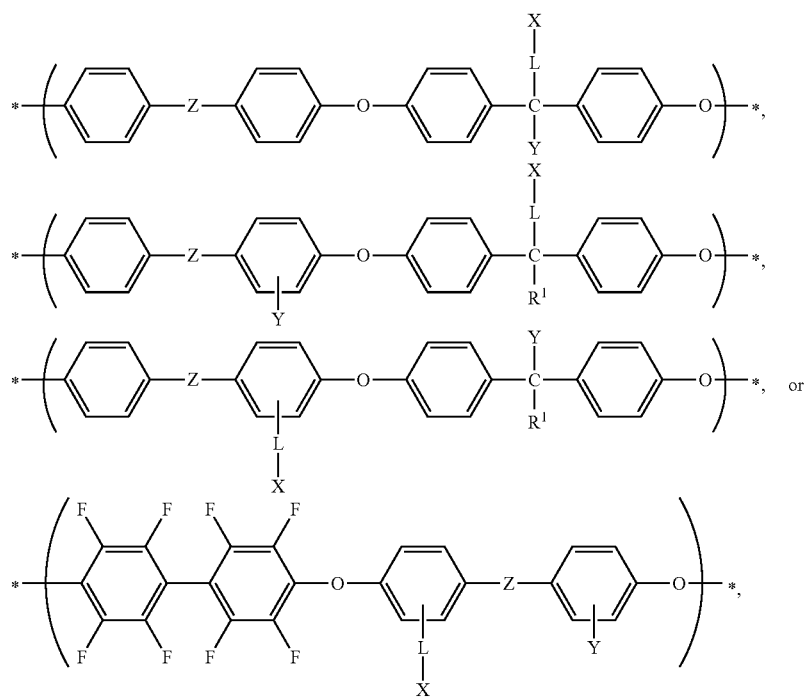

wherein X is the pendent proton transfer group, L is the linking group, Y is the pendent hydrophobic group, Z is —C(=O)— or —S(=O)$_2$—, and $R^1$ is selected from the group consisting of hydrogen and $C_1$-$C_6$ alkyl. These polymers can be synthesized by base-catalyzed copolymerization of the corresponding bisphenols and bis(aryl halide)s.

In some embodiments, the polymer backbone is a polyquinoxaline. For example, the repeating units can have the structure

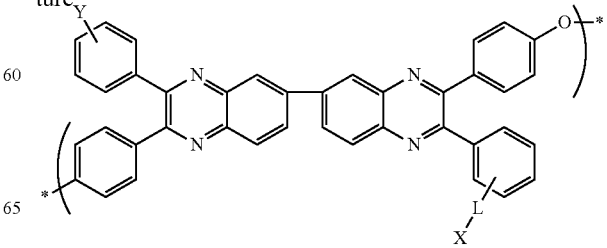

wherein X is the pendent proton transfer group, L is the linking group, and Y is the pendent hydrophobic group. Polyquinoxalines can be synthesized from the corresponding aromatic 1,2-diamines and 1,2-diketones by condensation reaction.

In some embodiments, the polymer backbone is a poly(phenylene ether) or a poly(phenylene sulfide). For example, the repeating units can have the structure

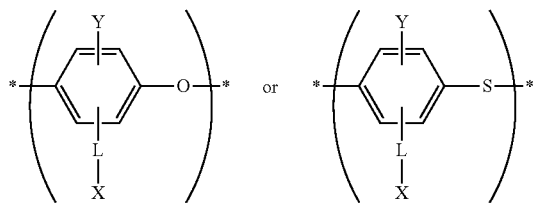

wherein X is the pendent proton transfer group, L is the linking group, and Y is the pendent hydrophobic group. The poly(phenylene ether)s can be synthesized by oxidative polymerization of the corresponding functionalized phenol, or by base-catalyzed polymerization of the corresponding 4-halophenol. The poly(phenylene sulfide) can be synthesized by reaction of sodium sulfide with the corresponding functionalized p-dichlorobenzene.

In some embodiments, the polymer backbone is a polyimide or a polyetherimide. For example, the repeating units can have the structure

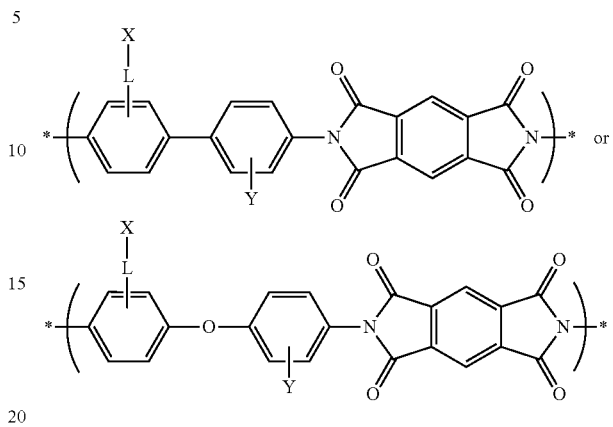

wherein X is the pendent proton transfer group, L is the linking group, and Y is the pendent hydrophobic group. Polyimides and polyetherimides can be prepared by the condensation of the corresponding diamines with aromatic tetracarboxylic dianhydrides.

In some embodiments, the polymer backbone is a polyurethane or a polyurea. For example, the repeating units can have the structure

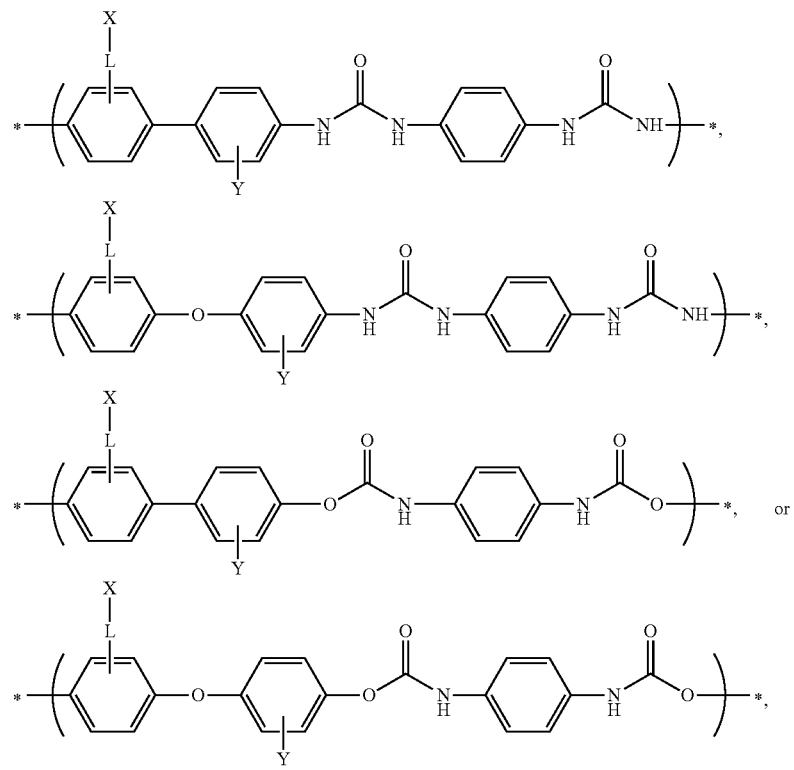

wherein X is the pendent proton transfer group, L is the linking group, and Y is the pendent hydrophobic group. Polyurethanes and polyureas can be prepared by condensation of the corresponding diols or diamines, respectively, with aromatic diisocyanates.

In the embodiments described above, the hydrophobic group and proton transfer group are present in each repeating unit. It is also possible to form the polymer by random copolymerization of a first monomer comprising at least one hydrophobic group and a second monomer comprising at least one linking group/proton transfer group combination. Thus, one embodiment is a random copolymer comprising a plurality of first repeating units having the structure

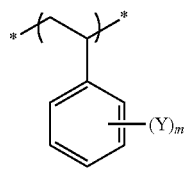

wherein m is 1 or 2; and Y is a hydrophobic group selected from the group consisting of $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl; and a plurality of second repeating units having the structure

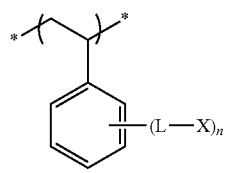

wherein n is 1 or 2; L is a linking group comprising about 3 to about 10 aliphatic carbon atoms; and X is a proton transfer group selected from the group consisting of hydroxyl,

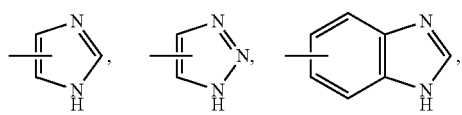

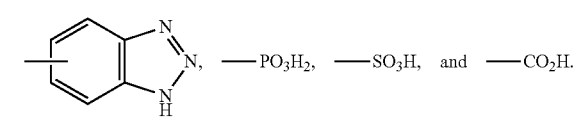

In these embodiments, it is preferred to use a roughly equimolar ratio of the first and second monomers. Thus, the random copolymer can comprise the first repeating units and the second repeating units in a molar ratio of about 0.2:1 to about 5:1, specifically about 0.5:1 to about 2:1, more specifically about 0.75:1 to about 1.5:1.

In a specific embodiment demonstrated in the working examples below, the first repeating units have the structure

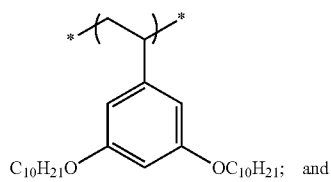

the second repeating units have the structure

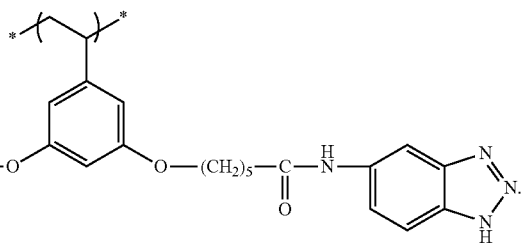

In another specific embodiment demonstrated in the working examples below, the first repeating units have the structure

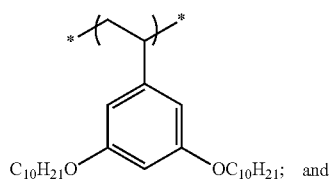

the second repeating units have the structure

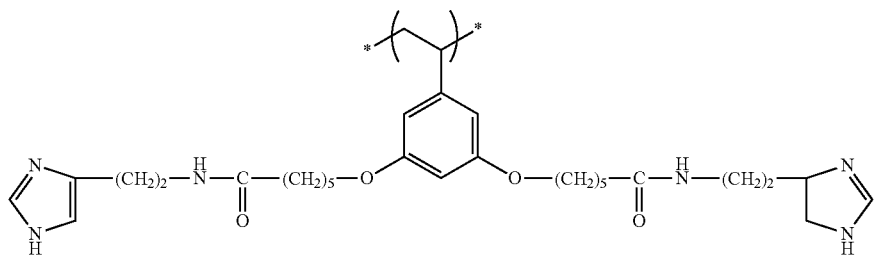

As demonstrated in the working examples below, ordered nanostructures are spontaneously produced in solvent-caste films of the polymer. It is expected that extrusion of polymer films or molding of polymer would also spontaneously produce ordered nanostructures. It is also expected that the extent of long-range order in the nanostructures could be improved with the use of solvent annealing and/or thermal annealing techniques that have previously been used to enhance the degree of ordering in block copolymer systems. See, e.g., U.S. Patent Application Publication No. US 2008/0230514 A1 of Park et al.; U.S. patent application Ser. No. 12/553,401 of Russell et al., filed Sep. 3, 2009; U.S. patent application Ser. No. 12/553,484 of Russell et al., filed Sep. 3, 2009; U.S. patent application Ser. No. 12/566,705 of Russell et al., filed Sep. 25, 2009; and annealing-related references cited within the foregoing applications.

The polymers are useful as materials for the fabrication of proton transfer devices, including proton exchange membranes for fuel cells. A proton exchange membrane is essentially a polymer film, and it can be formed by film-forming techniques including solvent casting, extrusion, and molding. Methods of fabricating integrating proton exchange membranes into a fuel cell are known. See, e.g., B. Y. Park and M. J. Madou, "Design, fabrication, and initial testing of a miniature PEM fuel cell with micro-scale pyrolized carbon fluidic plates", *Journal of Power Sources* 162, 369-379 (2006).

One embodiment is a method of increasing the efficiency of proton transport in a proton exchange membrane. The method comprises: conducting protons through an ordered array of phase-separated nanochannels in a polymeric material; wherein the phase-separated nanochannels have an average width of about 0.5 to about 5 nanometers and an average length of at least 20 nanometers; and wherein the phase-separated nanochannels comprise about 5 to about 20 millimoles per centimeter$^3$ of the proton-conducting group. The efficiency of proton transport in a proton exchange membrane can be determined using proton conductivity measurements. Within the range of about 0.5 to about 5 nanometers, the nanochannel width can be about 1 to about 4 nanometers, specifically about 2 to about 4 nanometers. Within the limit that the nanochannels have an average length of at least 20 nanometers, the length can be 20 to about 100 nanometers, specifically 20 to about 50 nanometers. Nanochannel dimensions can be determined by x-ray diffraction, neutron diffraction, or electron microscopy. Within the range of about 5 to about 20 millimoles per centimeter$^3$, the proton-conducting group concentration in the nanochannels can be about 8 to about 15 millimoles per centimeter$^3$. In the context of this embodiment, the term "ordered array" means a regularly repeating array. The ordered array of this embodiment stands in contrast to the essentially random distribution of proton channels in Nafion membranes. See, e.g., K. Schmidt-Rohr and Q. Chen, "Parallel cylindrical water nanochannels in Nafion fuel-cell membranes", *Nature Materials* 7, 75-83 (2008). Types of ordered arrays include, for example, lamellae (as demonstrated below for polymer P1) and hexagonal arrays of cylindrical channels (as demonstrated below for polymer P3).

The invention includes at least the following embodiments.

Embodiment 1

A polymer, comprising: a plurality of repeating units; wherein each repeating unit comprises a pendent hydrophobic group, and a pendent proton transfer group bound to the repeating unit via a linking group.

Embodiment 2

The polymer of embodiment 1, wherein the pendent hydrophobic group is selected from the group consisting of $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl.

Embodiment 3

The polymer of embodiment 1 or 2, wherein the pendent hydrophobic group is $C_5$-$C_{20}$ perfluorinated hydrocarbyl.

Embodiment 4

The polymer of any of embodiments 1-3, wherein the pendent proton transfer group is selected from the group consisting of hydroxyl,

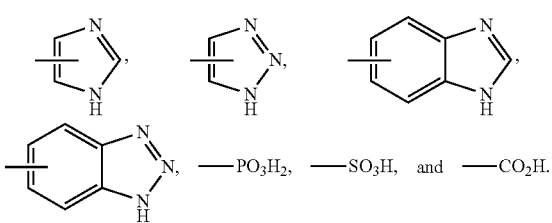

Embodiment 5

The polymer of any of embodiments 1-4, wherein the pendent proton transfer group is

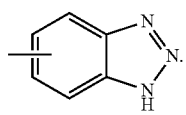

Embodiment 6

The polymer of any of embodiments 1-5, wherein the linking group is a divalent group comprising about 3 to about 10 aliphatic carbon atoms.

Embodiment 7

The polymer of any of embodiments 1-6, wherein the repeating units have the structure

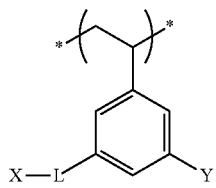

wherein X is the pendent proton transfer group, L is the linking group, and Y is the pendent hydrophobic group.

Embodiment 8

The polymer of embodiment 7, wherein the repeating units are selected from the group consisting of

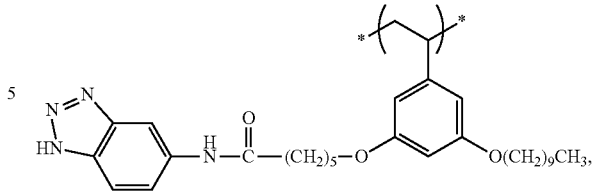

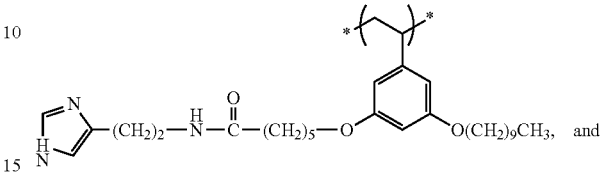

combinations thereof.

Embodiment 9

The polymer of any of embodiments 1-6, wherein the repeating units have a structure selected from the group consisting of

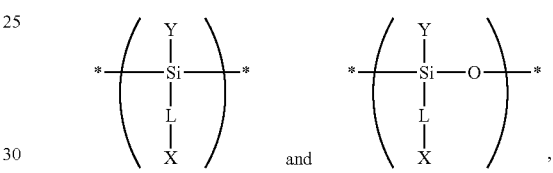

wherein X is the pendent proton transfer group, L is the linking group, and Y is the pendent hydrophobic group.

Embodiment 10

The polymer of any of embodiments 1-6, wherein the repeating units have a structure selected from the group consisting of

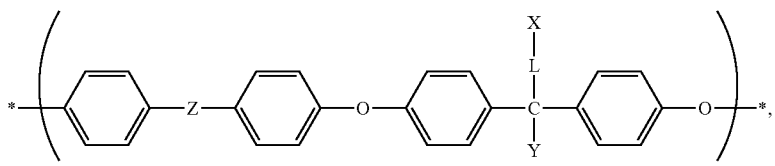

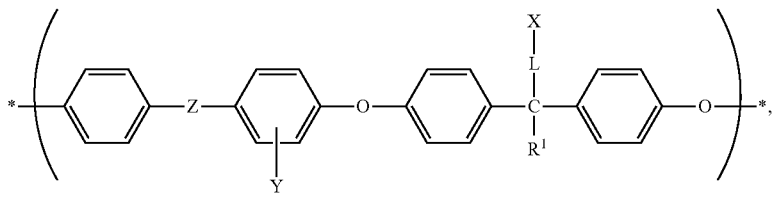

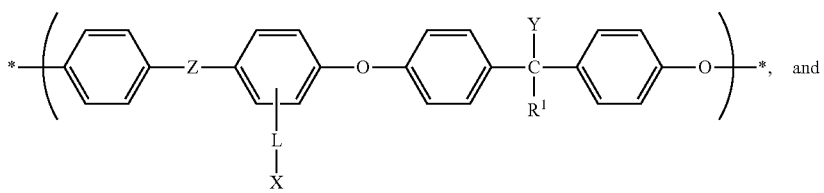

-continued

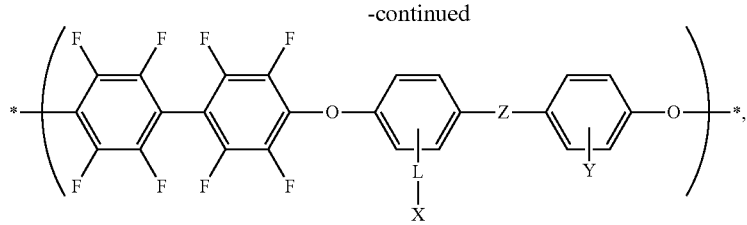

wherein X is the pendent proton transfer group, L is the linking group, Y is the pendent hydrophobic group, Z is —C(=O)— or —S(=O)$_2$—, and R$^1$ is selected from the group consisting of hydrogen and C$_1$-C$_6$ alkyl.

Embodiment 11

The polymer of any of embodiments 1-6, wherein the repeating units have the structure

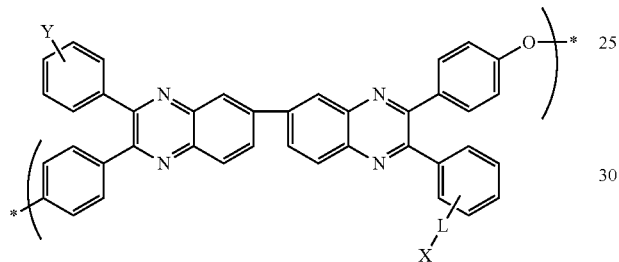

wherein X is the pendent proton transfer group, L is the linking group, and Y is the pendent hydrophobic group.

Embodiment 12

The polymer of any of embodiments 1-6, wherein the repeating units have a structure selected from the group consisting of

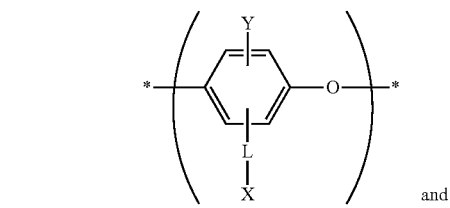 and

-continued

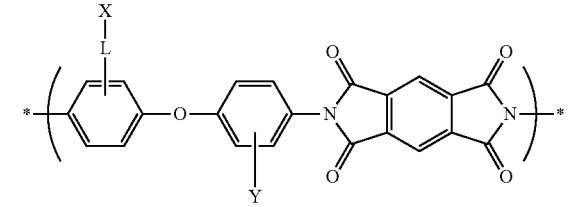

wherein X is the pendent proton transfer group, L is the linking group, and Y is the pendent hydrophobic group.

Embodiment 13

The polymer of any of embodiments 1-6, wherein the repeating units have a structure selected from the group consisting of

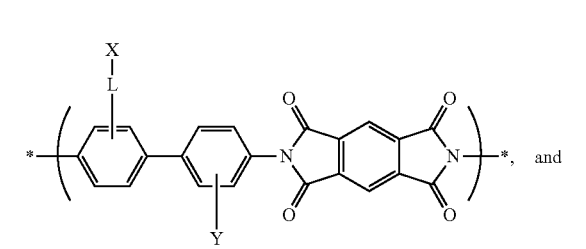

wherein X is the pendent proton transfer group, L is the linking group, and Y is the pendent hydrophobic group.

Embodiment 14

The polymer of any of embodiments 1-6, wherein the repeating units have a structure selected from the group consisting of

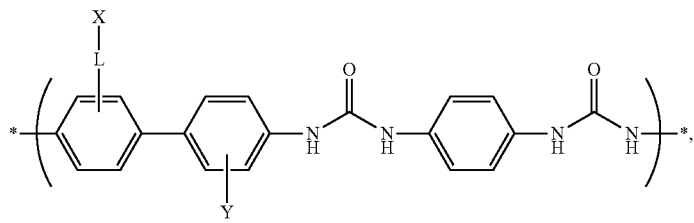

-continued

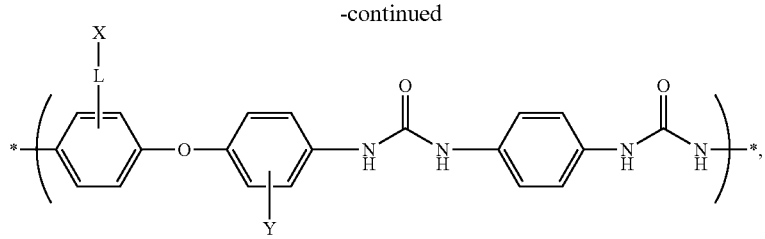

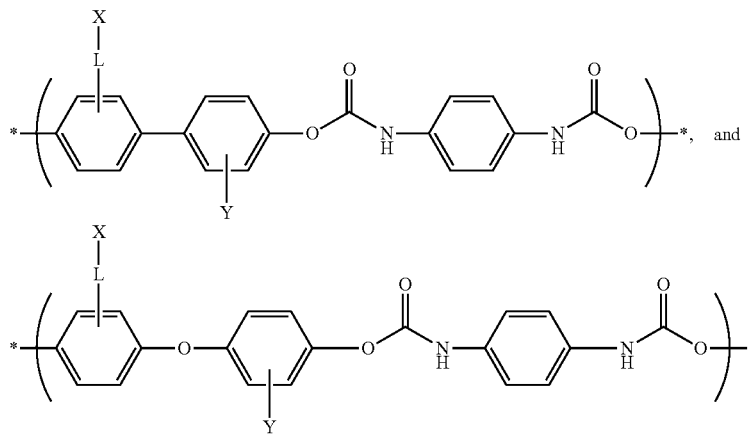

wherein X is the pendent proton transfer group, L is the linking group, and Y is the pendent hydrophobic group.

Embodiment 15

A random copolymer, comprising: a plurality of first repeating units having the structure

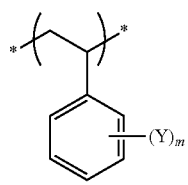

wherein m is 1 or 2; and Y is a hydrophobic group selected from the group consisting of $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl; and a plurality of second repeating units having the structure

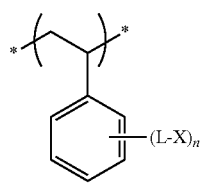

wherein n is 1 or 2; L is a linking group comprising about 3 to about 10 aliphatic carbon atoms; and X is a proton transfer group selected from the group consisting of hydroxyl,

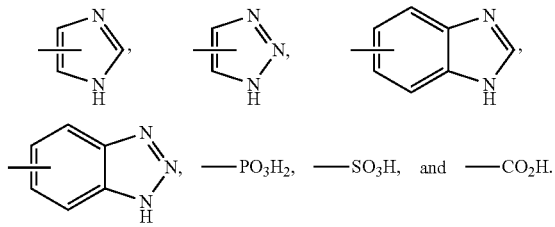

Embodiment 16

The random copolymer of embodiment 15, comprising the first repeating units and the second repeating units in a molar ratio of about 0.2:1 to about 5:1.

Embodiment 17

The random copolymer of embodiment 15 or 16, wherein the first repeating units have the structure

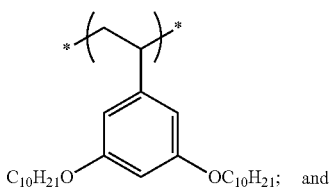

wherein the second repeating units have a structure selected from the group consisting of

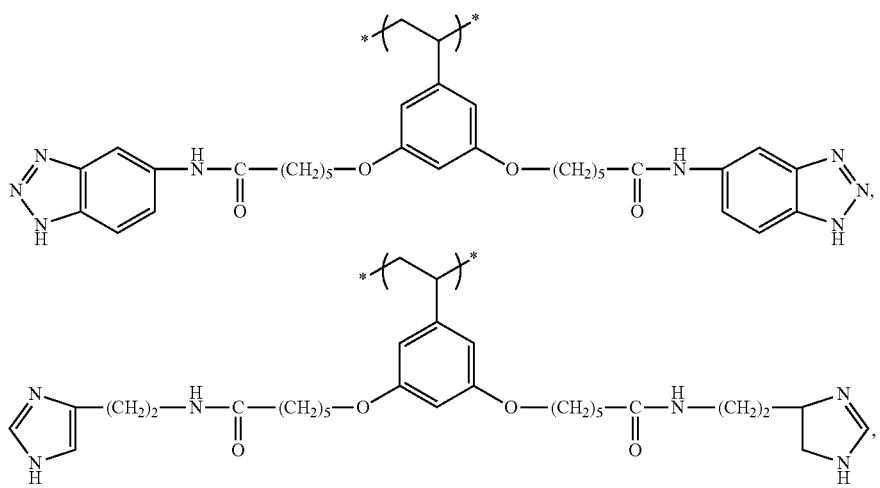

and combinations thereof.

Embodiment 18

A proton exchange membrane comprising the polymer of any of embodiments 1-14.

Embodiment 19

A proton exchange membrane comprising the random copolymer of any of embodiments 15-17.

Embodiment 20

A fuel cell comprising the proton exchange membrane of embodiment 18 or 19.

Embodiment 21

A method of increasing the efficiency of proton transport in a proton exchange membrane, comprising: conducting protons through an ordered array of phase-separated nanochannels in a polymeric material; wherein the phase-separated nanochannels have an average width of about 0.5 to about 5 nanometers and an average length of at least 20 nanometers; and wherein the phase-separated nanochannels comprise about 5 to about 20 millimoles per centimeter$^3$ of the proton-conducting group.

The invention is further illustrated by the following non-limiting examples.

Preparative Example 1

This example describes the synthesis and characterization of benzotriazole-substituted comb polymer P1.

The synthetic procedure is summarized in FIG. 1. Precursor polymer 7 was prepared as described in S. Basu, D. R. Vutukuri, and S. Thayumanavan, "Homopolymer micelles in heterogeneous solvent mixtures". *J. Am. Chem. Soc.* 127, 16794-16795 (2005). In short, polymer 7 was synthesized by polymerization of the styrene-based monomer having an ethyl ester group and a decyl group with ether linkages at each meta position relative to the styrene olefinic group, followed by the hydrolysis of the ethyl ester group. The number average molecular weight ($M_n$) was determined by size exclusion chromatography (SEC) using polystyrene standards and per-formed before the hydrolysis of ethyl ester group. 5-Amino-1H-benzotriazole was purchased from Alfa Aesar (USA). All other chemicals were purchased from Sigma Aldrich (USA). Proton nuclear magnetic resonance ($^1$H-NMR) spectra were recorded on a 400 megahertz NMR spectrometer using residual proton resonance of the solvents as internal standard. Chemical shifts are reported in parts per million (ppm).

Compound 2: 3,5-Dihydroxybenzyl alcohol 1 (4.2 grams, 30 millimoles), potassium carbonate (4.1 grams, 30 millimoles), 18-Crown-6 (0.4 gram, 1.5 millimoles), $C_{10}H_{21}Br$ (6.3 milliliter, 30 millimoles), and NaI (4.5 grams, 30 millimoles) were taken in 150 milliliter of acetone and refluxed for 12 hours under argon atmosphere. The reaction mixture was allowed to cool and solvent was evaporated to dryness. The residue was partitioned between water and ethyl acetate. The organic layer was separated, and the aqueous layer extracted with ethyl acetate. The combined organic layer was washed with brine and dried with anhydrous $Na_2SO_4$ and evaporated to dryness. The residue was purified by silica gel column, eluting with EtOAc/hexane (40:60) to afford 2.8 gram (33%) of 2 as a colorless solid. $^1$H-NMR (400 MHz, CDCl$_3$) δ 6.48 (s, 1H), 6.43 (s, 1H), 6.32 (t, 1H), 4.60 (s, 2H), 3.92 (t, 2H), 1.79-1.72 (quintet, 2H), 1.45-1.27 (m, 14H), 0.88 (t, 3H).

Compound 3: Compound 2 (2.3 grams, 8.2 millimoles) was dissolved in acetone (25 milliliters). To this solution were added, $K_2CO_3$ (1.4 grams, 10 millimoles), NaI (1.2 grams, 8.2 millimoles) and 18-Crown-6 (0.1 grams, 0.4 millimoles) followed by ethyl 6-bromohexanoate (1.5 milliliters, 8.2 millimoles). The reaction mixture was refluxed for 36 hours. It was then cooled to room temperature and solvent was evaporated to dryness. The residue was partitioned between water and EtOAc. The organic layer was separated, and the aqueous layer was extracted with EtOAc. The combined organic layer was dried over $Na_2SO_4$ and evaporated to dryness. The crude product was purified by silica gel chromatography by elution with EtOAc/hexane (20:80) to afford 3.4 g of compound 3 (98% yield). $^1$H-NMR (400 MHz, CDCl$_3$) δ 6.48 (s, 1H), 6.43 (s, 1H), 6.32 (t, 1H), 4.60 (s, 2H), 4.12 (quartet, 2H), 3.94 (t, 4H), 2.31 (t, 2H), 1.78-1.23 (m, 25H), 0.88 (t, 3H).

Compound 4: To a stirred solution of compound 3 (3.0 grams, 7.1 millimoles) in dry $CH_2Cl_2$ (60 milliliters) was added pyridinium chlorochromate (1.83 grams, 8.5 millimoles). It was stirred at room temperature for 3 hours. The reaction mixture was filtered over alumina and the filtrate was evaporated and purified by silica gel column chromatography (12-15% ethyl acetate in hexanes) to afford 2.6 g (87% yield) of 4. $^1$H-NMR (400 MHz, CDCl$_3$) δ 9.88 (s, 1H), 7.03 (s, 1H), 6.94 (s, 1H), 6.73 (t, 1H), 4.13 (quartet, 2H), 3.99 (t, 4H), 2.31 (t, 2H), 1.78-1.23 (m, 25H), 0.88 (t, 3H).

Compound 5: CH$_3$PPh$_3$Br (2.6 grams, 7.2 millimoles) was taken in dry THF (50 milliliters) and KOtBu (0.83 gram, 7.2 millimoles) was added to this under nitrogen atmosphere. This reaction mixture was stirred for 20 minutes and a solution of 4 (2.4 grams, 5.7 millimoles) in 40 milliliters of dry THF was added slowly from a dropping funnel. The reaction mixture was further stirred at room temperature for 5 hours. The reaction mixture was filtered and the filtrate evaporated and purified by silica gel column chromatography (1-2% ethyl acetate in hexanes) to afford 2.1 g (90% yield) of 5. $^1$H-NMR (400 MHz, CDCl$_3$) δ 6.65-6.58 (m, 2H), 6.53 (s, 1H), 6.36 (t, 1H), 5.70 (d, 1H), 5.23 (d, 1H), 4.13 (quartet, 2H), 3.95 (t, 4H), 2.33 (t, 2H), 1.78-1.23 (m, 25H), 0.88 (t, 3H).

Polymer 6: A mixture of compound 5 (1.25 grams, 3 millimoles) and alkoxyamine (0.0162 gram, 0.05 millimole) were degassed by three freeze/thaw cycles, sealed under argon, and heated at 125° C. under argon for 12 hours. The reaction mixture was allowed to cool down to room temperature. The solidified reaction mixture was then dissolved in dichloromethane and precipitated into methanol/water mixture. The precipitate was then collected by vacuum filtration and dried to give polymer 6, as a gummy product 1.1 g (90% yield); SEC (polystyrene/THF): M$_n$=21 K, PD=1.2. $^1$H-NMR (400 MHz, CDCl$_3$) δ 6.08-5.79 (m, 3H), 4.15 (s, 2H), 3.95 (s, 4H), 2.31 (s, 2H), 1.79-1.24 (m, 25H), 0.89 (s, 3H).

Polymer 7: To a solution of polymer 6 (1.0 gram, 2.4 millimoles) in THF (30 milliliters) was added aqueous potassium hydroxide (1.34 grams, 24 millimoles) dissolved in water (4 milliliters). Methanol (12 milliliters) was then added to this two-phase system to give a homogeneous solution. This mixture was then refluxed for 12 hours. The reaction mixture was evaporated to dryness and the residue was dissolved in water (20 milliliters) and then heated at reflux for another 24 hours. After cooling to room temperature, the reaction mixture was acidified with 2N HCl. The precipitate formed was collected by vacuum filtration and dried to afford polymer 7. Yield: 0.84 g (89%). $^1$H-NMR (400 MHz, DMSO-d6) δ 12.5 (bs, 1H), 6.04-5.71 (m, 3H), 3.96 (s, 4H), 2.32 (s, 2H), 1.74-1.20 (m, 22H), 0.91 (s, 3H).

P1: Polymer 7 (M$_n$=19,000, 390 milligrams, 1 equivalent) was dissolved in a solvent mixture of 2 milliliters of dry DMF and 20 milliliters of dry THF. To this solution, 0.2 milliliters of triethylamine (1.4 equivalent) was added. This mixture was kept in ice bath and stirred for 10 min Ethyl chloroformate (ECF) (130 milligrams, 1.2 equivalents) was then added into the mixture in ice bath and stirred for 30 minutes. The reaction mixture was then removed from ice bath and stirred at room temperature for another 30 minutes. White precipitates were filtered and the filtrate was then added into a solution of 5-Amino-1H-benzotriazole (161 milligrams, 1.2 equivalents) in 10 milliliters of dry THF. This reaction mixture was further stirred for 30 hours. Solvents of the reaction mixture were then reduced by rotary evaporation until solution became viscous and polymer P1 was obtained by precipitation in distilled water as yellowish solid (415 milligrams, 82% yield). $^1$H-NMR (400 MHz, DMSO-d6) δ 8.36 (s, 1H), 7.87 (s, 1H), 7.52 (s, 1H), 7.30 (s, 1H), 6.02-5.65 (m, 3H), 4.03 (s, 4H), 2.33 (s, 2H), 1.75-1.08 (m, 22H), 0.90 (s, 3H).

Preparative Example 2

This example describes the synthesis and characterization of imidazole-substituted comb polymer P3.

Figure 2:
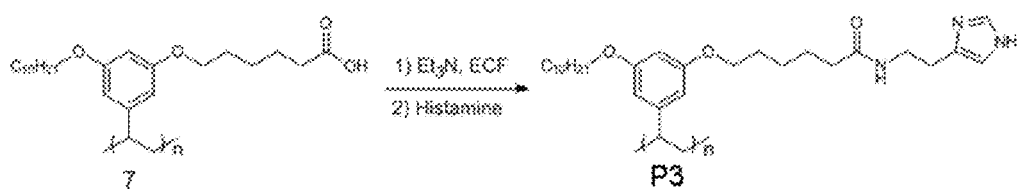
FIG. 2 is a synthetic scheme for the synthesis of polymer P3.

The synthetic procedure is summarized in FIG. 2. Polymer 7 (M$_n$=19,000, 390 milligrams, 1 equivalent) was dissolved in a solvent mixture of 2 milliliters of dry DMF and 20 milliliters of dry THF. To this solution, 0.2 milliliter of triethylamine (1.4 equivalents) was added. This mixture was kept in ice bath and stirred for 10 minutes. Ethyl chloroformate (ECF) (130 milligrams, 1.2 equivalents) was then added into the mixture in ice bath and stirred for 30 minutes. The reaction mixture was then removed from ice bath and stirred at room temperature for another 30 minutes. White precipitates were filtered and the filtrate was then added into a solution of histamine (133 milligrams, 1.2 equivalents) in 5 milliliters of dry DMF. This reaction mixture was further stirred for 30 hours. Solvents of the reaction mixture were then reduced by rotary evaporation until solution became viscous and polymer P3 was obtained by precipitation in distilled water as yellowish solid (376 milligrams, 78% yield). $^1$H-NMR (400 MHz, DMSO-d6) δ 8.72 (s, 1H), 8.01 (s, 1H), 7.32 (s, 1H), 6.32-5.54 (m, 3H), 4.16 (s, 4H), 3.64 (s, 2H), 2.90 (s, 2H), 2.28 (s, 2H), 1.76-1.10 (m, 22H), 0.88 (s, 3H).

Preparative Example 3

This example describes the synthesis and characterization of benzotriazole-substituted comb polymer P2, which lacks hydrophobic substituents.

Figure 3:
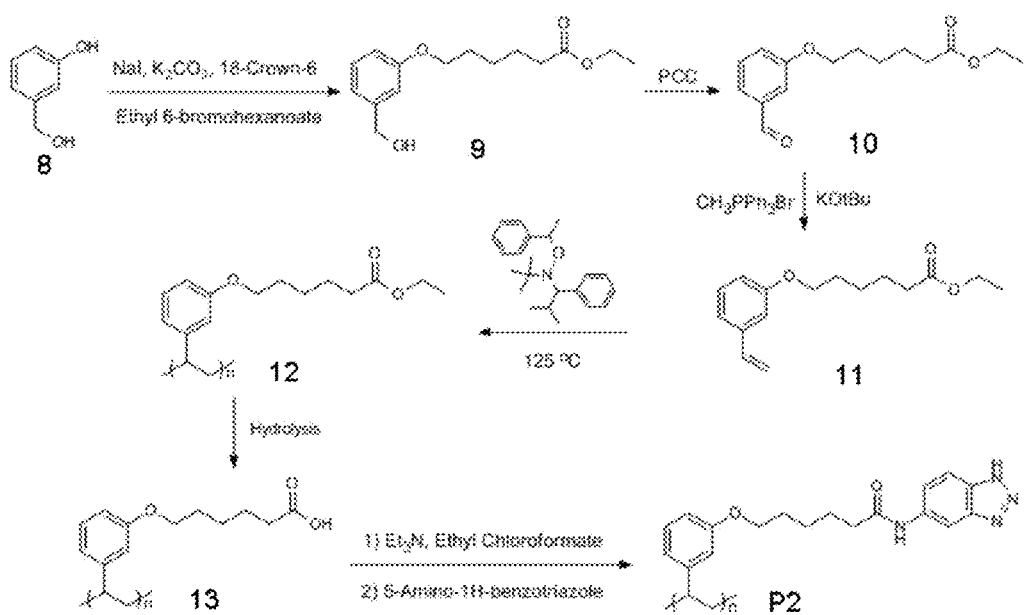
FIG. 3 is a synthetic scheme for the synthesis of polymer P2.

The synthetic procedure is summarized in FIG. 3.

Compound 9: 3-Hydroxybenzyl alcohol 8 (2.48 grams, 20 millimoles), potassium carbonate (3.28 grams, 24 millimoles), 18-Crown-6 (0.4 gram, 1.5 millimoles), ethyl 6-bromohexanoate (4 milliliters, 22 millimoles) and NaI (3.3 grams, 22 millimoles) were taken in 100 milliliters of acetone. The reaction mixture was refluxed for 24 hours. It was then cooled to room temperature and solvent was evaporated to dryness. The residue was partitioned between water and EtOAc. The organic layer was separated, and the aqueous layer was extracted with EtOAc. The combined organic layer was dried over Na$_2$SO$_4$ and evaporated to dryness. The crude product was purified by silica gel chromatography by elution with EtOAc/hexane (20:80) to afford 4.8 grams of compound 9 (90% yield). $^1$H-NMR (400 MHz, CDCl$_3$) δ 7.27 (t, 1H), 7.01 (d, 1H), 6.92 (s, 1H), 6.81 (d, 1H), 4.66 (s, 2H), 4.13 (quartet, 2H), 3.97 (t, 2H), 2.33 (t, 2H), 1.80-1.50 (m, 6H), 1.25 (t, 3H).

Compound 10: To a stirred solution of compound 9 (4.7 grams, 17.6 millimoles) in dry CH$_2$Cl$_2$ (120 milliliters) was added pyridinium chlorochromate (4.6 grams, 21.4 millimoles). It was stirred at room temperature for 3 hours. The reaction mixture was filtered over alumina and the filtrate was evaporated and purified by silica gel column chromatography (12-15% ethyl acetate in hexanes) to afford 4.1 grams (88% yield) of 10. $^1$H-NMR (400 MHz, CDCl$_3$) δ 9.97 (s, 1H), 7.44 (t, 1H), 7.34 (d, 1H), 7.20 (s, 1H), 7.17 (d, 1H), 4.14 (quartet, 2H), 4.02 (t, 2H), 2.34 (t, 2H), 1.83-1.52 (m, 6H), 1.26 (t, 3H).

Compound 11: CH$_3$PPh$_3$Br (6.6 grams, 18 millimoles) was taken in dry THF (80 milliliters) and KOtBu (2.1 grams, 18 millimoles) was added to this under nitrogen atmosphere. This reaction mixture was stirred for 20 minutes and a solution of 10 (3.8 grams, 14.4 millimoles) in 60 milliliters of dry THF was added slowly from a dropping funnel. The reaction mixture was further stirred at room temperature for 5 hours. The reaction mixture was filtered and the filtrate evaporated and purified by silica gel column chromatography (1-2% ethyl acetate in hexanes) to afford 3.4 grams (90% yield) of 11. $^1$H-NMR (400 MHz, CDCl$_3$) δ 7.24 (t, 1H), 6.98 (d, 1H), 6.93 (s, 1H), 6.80 (d, 1H), 6.68 (t, 1H), 5.73 (d, 1H), 5.23 (d, 1H), 4.14 (quartet, 2H), 3.97 (t, 2H), 2.33 (t, 2H), 1.83-1.49 (m, 6H), 1.26 (t, 3H).

Polymer 12: A mixture of compound 11 (1.6 grams, 6 millimoles) and alkoxyamine (0.0242 grams, 0.075 millimole) were degassed by three freeze/thaw cycles, sealed under argon, and heated at 125° C. under argon for 12 hours. The reaction mixture was allowed to cool down to room temperature. The solidified reaction mixture was then dissolved in dichloromethane and precipitated into methanol/water mixture. The precipitate was then collected by vacuum filtration and dried to give polymer 12 as a gummy product 1.4 grams (89% yield); SEC (polystyrene/THF): Mn=19 K, PD=1.2. $^1$H-NMR (400 MHz, CDCl$_3$) δ 6.78-6.10 (m, 4H), 4.13 (s, 2H), 3.94 (s, 2H), 2.34 (s, 2H), 1.91-1.22 (m, 9H).

Polymer 13: To a solution of polymer 12 (1.2 grams, 4.5 millimoles) in THF (30 milliliters) was added aqueous potassium hydroxide (1.34 grams, 24 millimoles) dissolved in water (4 milliliters). Methanol (12 milliliters) was then added to this two-phase system to give a homogeneous solution. This mixture was then refluxed for 12 hours. The reaction mixture was evaporated to dryness and the residue was dissolved in water (20 milliliters) and then heated at reflux for another 24 h. After cooling to room temperature, the reaction mixture was acidified with 2N HCl. The precipitate formed was collected by vacuum filtration and dried to afford polymer 13. Yield: 0.98 grams (91%). $^1$H-NMR (400 MHz, DMSO-d6) δ 11.9 (bs, 1H), 6.75-6.04 (m, 4H), 3.97 (s, 2H), 2.33 (s, 2H), 1.83-1.38 (m, 6H).

Benzotriazole polymer P2: Polymer 13 (M$_n$=17,000, 468 milligrams, 1 equivalent) was dissolved in 35 milliliters of dry DMF. To this solution, 0.4 milliliter of triethylamine (1.4 equivalents) was added. This mixture was kept in ice bath and stirred for 10 min. Ethyl Chloroformate (ECF) (260 milligrams, 1.2 equivalents) was then added into the mixture in ice bath and stirred for 30 min The reaction mixture was then removed from ice bath and stirred at room temperature for another 30 min. White precipitates were filtered and the filtrate was then added into a solution of 5-Amino-1H-benzotriazole (322 milligrams, 1.2 equivalents) in 10 milliliters of dry THF. This reaction mixture was further stirred for 30 hours. Solvents of the reaction mixture were then reduced by rotary evaporation until solution became viscous and polymer P2 was obtained by precipitation in distilled water as yellowish solid (364 milligrams, 52% yield). $^1$H-NMR (400 MHz, DMSO-d6) δ 8.40 (s, 1H), 7.91 (s, 1H), 7.67 (s, 1H), 7.24 (s, 1H), 6.77-6.02 (m, 4H), 4.00 (s, 2H), 2.37 (s, 2H), 1.84-1.35 (m, 6H).

Preparative Example 4

This example describes the synthesis and characterization of imidazole-substituted comb polymer P4, which lacks hydrophobic substituents.

Figure 4:
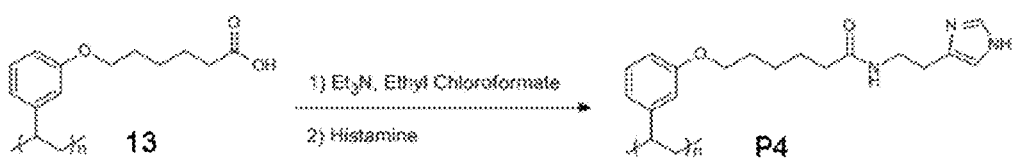
FIG. 4 is a synthetic scheme for the synthesis of polymer P4.

The synthetic procedure is summarized in FIG. 4.

Imidazole polymer P4: Polymer 13 (M$_n$=17,000, 468 milligrams, 1 equivalent) was dissolved in 35 milliliters of dry DMF. To this solution, 0.4 milliliter of triethylamine (1.4 equivalents) was added. This mixture was kept in an ice bath and stirred for 10 minutes. Ethyl chloroformate (ECF) (260 milligrams, 1.2 equivalents) was then added into the mixture in ice bath and stirred for 30 minutes. The reaction mixture was then removed from ice bath and stirred at room temperature for another 30 minutes. White precipitates were filtered and the filtrate was then added into a solution of histamine (266 mg, 12 equivalents) in 10 milliliters of dry DMF. This reaction mixture was further stirred for 30 hours. Solvent of the reaction mixture was then reduced by rotary evaporation until solution became viscous and polymer P4 was obtained by precipitation in distilled water as yellowish solid (360 milligrams, 55% yield). $^1$H-NMR (400 MHz, DMSO-d6) δ 8.70 (s, 1H), 8.01 (s, 1H), 7.32 (s, 1H), 6.76-6.02 (m, 4H), 3.98 (s, 2H), 3.62 (s, 2H), 2.91 (s, 2H). 2.37 (s, 2H), 1.85-1.35 (m, 6H).

Preparative Examples 5 and 6

This example describes the synthesis and characterization of benzotriazole-substituted and imidazole-substituted random copolymers RCP1 and RCP2.

Figure 5:
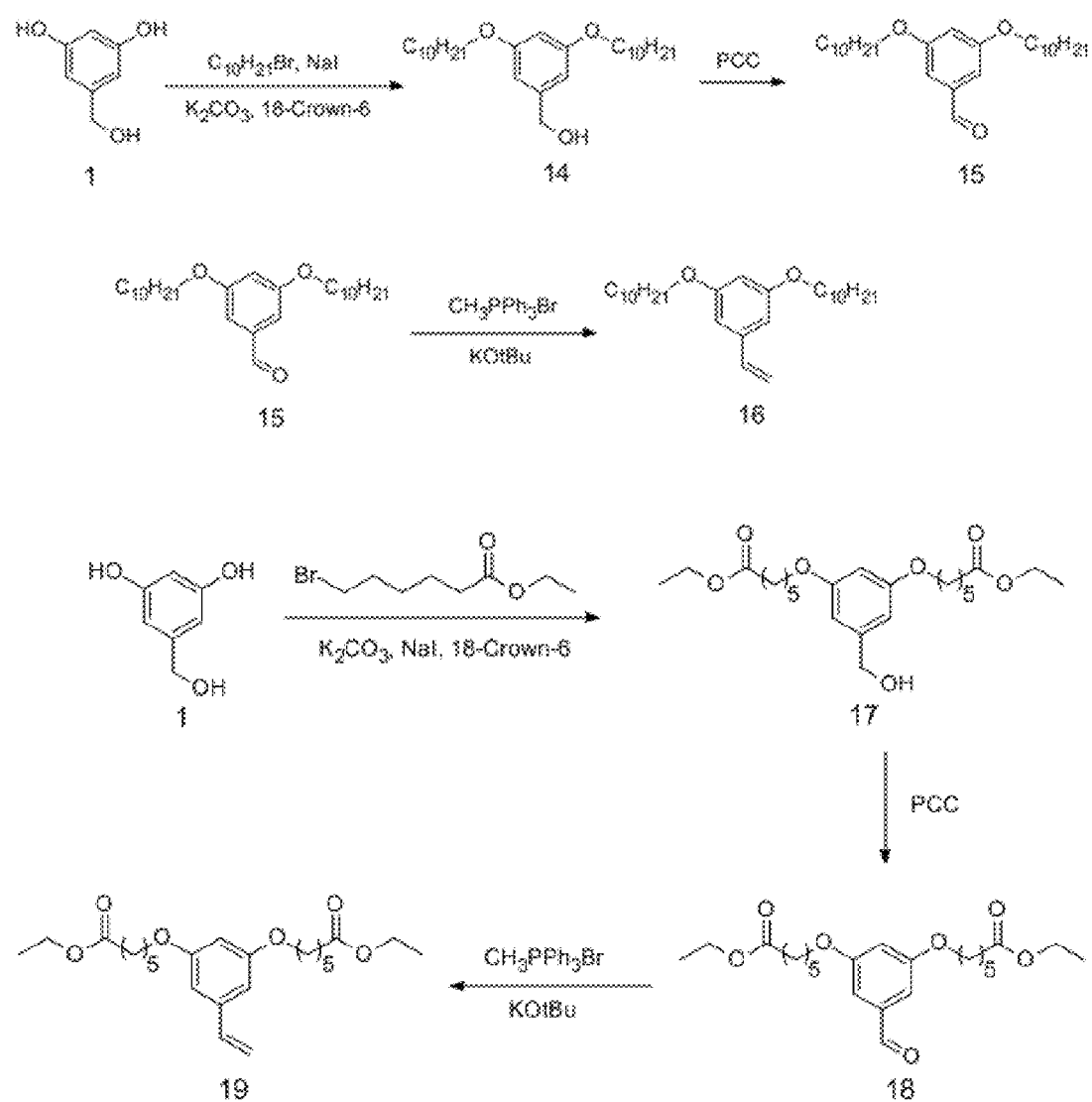
FIG. 5 is a synthetic scheme for the synthesis of monomer 19.
Figure 5:
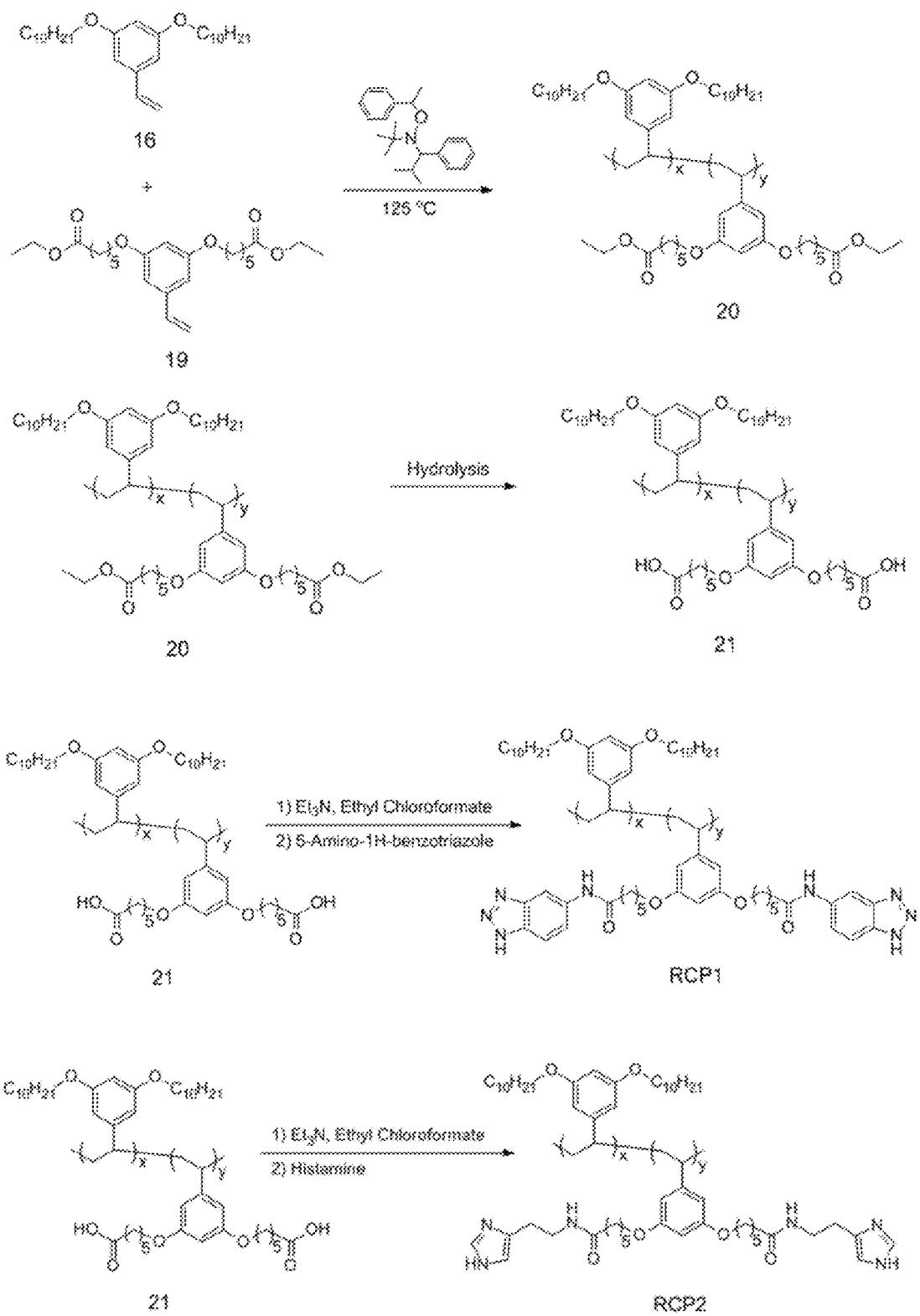

The synthetic procedure is summarized in FIG. 5.

Compound 14: 3,5-Dihydroxybenzyl alcohol 1 (2.1 grams, 15 millimoles), potassium carbonate (4.1 grams, 30 millimoles), 18-Crown-6 (0.4 grams, 1.5 millimoles), C$_{10}$H$_{21}$Br (6.3 milliliters, 30 millimoles) and NaI (4.5 grams, 30 millimoles) were taken in 150 milliliters of acetone and refluxed for 12 hours under argon atmosphere. The reaction mixture was allowed to cool and solvent was evaporated to dryness. The residue was partitioned between water and ethyl acetate. The organic layer was separated, the aqueous layer extracted with ethyl acetate. The combined organic layer was washed with brine and dried with anhydrous Na$_2$SO$_4$ and evaporated to dryness. The residue was purified by silica gel column, eluting with EtOAc/hexane (40:60) to afford 5.8 grams (92%) of 14 as a colorless solid. $^1$H-NMR (400 MHz, CDCl$_3$) δ 6.48 (s, 1H), 6.43 (s, 1H), 6.32 (t, 1H), 4.60 (s, 2H), 3.92 (t, 4H), 1.79-1.72 (quintet, 4H), 1.45-1.27 (m, 28H), 0.88 (t, 6H).

Compound 15: To a stirred solution of compound 14 (3.0 grams, 7.1 millimoles) in dry CH$_2$Cl$_2$ (60 milliliters) was added pyridinium chlorochromate (1.83 grams, 8.5 millimoles). It was stirred at room temperature for 3 hours. The reaction mixture was filtered over alumina and the filtrate was evaporated and purified by silica gel column chromatography (12-15% ethyl acetate in hexanes) to afford 2.6 grams (87% yield) of 15. $^1$H-NMR (400 MHz, CDCl$_3$) δ 9.88 (s, 1H), 7.03 (s, 1H), 6.94 (s, 1H), 6.73 (t, 1H), 3.99 (t, 4H), 1.79-1.72 (quintet, 4H), 1.45-1.27 (m, 28H), 0.88 (t, 6H).

Compound 16: CH$_3$PPh$_3$Br (2.6 grams, 7.2 millimoles) was taken in dry THF (50 milliliters) and KOtBu (0.83 gram, 7.2 millimoles) was added to this under nitrogen atmosphere. This reaction mixture was stirred for 20 min and a solution of 15 (2.4 grams, 5.7 millimoles) in 40 milliliters of dry THF was added slowly from a dropping funnel. The reaction mixture was further stirred at room temperature for 5 hours. The reaction mixture was filtered and the filtrate evaporated and purified by silica gel column chromatography (1-2% ethyl acetate in hexanes) to afford 2.0 grams (86% yield) of 16. $^1$H-NMR (400 MHz, CDCl$_3$) δ 6.68-6.62 (m, 2H), 6.58 (s, 1H), 6.36 (t, 1H), 5.70 (d, 1H), 5.26 (d, 1H), 3.98 (t, 4H), 1.79-1.72 (quintet, 4H), 1.45-1.27 (m, 28H), 0.88 (t, 6H).

Compound 17: 3,5-Dihydroxybenzyl alcohol 1 (1.5 grams, 11 millimoles), potassium carbonate (3.28 grams, 24 millimoles), 18-Crown-6 (0.3 gram, 1.1 millimoles), ethyl 6-bromohexanoate (4 milliliters, 22 millimoles) and NaI (3.3 grams, 22 millimoles) were taken in 100 milliliters of acetone. The reaction mixture was refluxed for 24 hours. It was then cooled to room temperature and solvent was evaporated to dryness. The residue was partitioned between water and EtOAc (3×). The combined organic layer was dried over Na$_2$SO$_4$ and evaporated to dryness. The crude product was purified by silica gel chromatography by elution with EtOAc/hexane (20:80) to afford 3.9 grams of compound 17 (85% yield). $^1$H-NMR (400 MHz, CDCl$_3$) δ 6.50-6.48 (m, 2H), 6.35 (s, 1H), 4.61 (s, 2H), 4.13 (quartet, 4H), 3.94 (t, 4H), 2.32 (t, 4H), 1.78 (quintet, 4H) 1.70 (quintet, 4H), 1.50 (quintet, 4H), 1.26 (t, 6H).

Compound 18: To a stirred solution of compound 17 (3.0 grams, 7.1 millimoles) in dry $CH_2Cl_2$ (60 milliliters) was added pyridinium chlorochromate (1.83 grams, 8.5 millimoles). It was stirred at room temperature for 3 hours. The reaction mixture was filtered over alumina and the filtrate was evaporated and purified by silica gel column chromatography (12-15% ethyl acetate in hexanes) to afford 2.6 grams (88% yield) of 18. $^1$H-NMR (400 MHz, $CDCl_3$) δ 9.85 (s, 1H), 7.01-6.88 (m, 2H), 6.65 (s, 1H), 4.13 (quartet, 4H), 3.94 (t, 4H), 2.32 (t, 4H), 1.78 (quintet, 4H) 1.70 (quintet, 4H), 1.50 (quintet, 4H), 1.26 (t, 6H).

Compound 19: $CH_3PPh_3Br$ (2.6 grams, 7.2 millimoles) was taken in dry THF (50 milliliters) and KOtBu (0.83 grams, 7.2 millimoles) was added to this under nitrogen atmosphere. This reaction mixture was stirred for 20 min and a solution of 18 (2.4 grams, 5.7 millimoles) in 40 milliliters of dry THF was added slowly from a dropping funnel. The reaction mixture was further stirred at room temperature for 5 hours. The reaction mixture was filtered and the filtrate evaporated and purified by silica gel column chromatography (1-2% ethyl acetate in hexanes) to afford 2.1 grams (88% yield) of 19. $^1$H-NMR (400 MHz, $CDCl_3$) δ 6.65-6.58 (m, 2H), 6.52 (s, 1H), 6.34 (t, 1H), 5.70 (d, 1H), 5.22 (d, 1H), 4.12 (quartet, 4H), 3.92 (t, 4H), 2.32 (t, 4H), 1.78 (quintet, 4H) 1.70 (quintet, 4H), 1.50 (quintet, 4H), 1.26 (t, 6H).

Polymer 20: A mixture of compound 16 (1.25 grams, 3 millimoles), compound 19 (1.26 grams, 3 mmol) and alkoxyamine (0.0324 gram, 0.1 millimole) were degassed by three freeze/thaw cycles, sealed under argon, and heated at 125° C. under argon for 12 hours. The reaction mixture was allowed to cool down to room temperature. The solidified reaction mixture was then dissolved in dichloromethane and precipitated into methanol/water mixture. The precipitate was then collected by vacuum filtration and dried to give polymer 6, as a gummy product 2.0 grams (80% yield); SEC (polystyrene/THF): $M_n$=16,000, PD=1.3. $^1$H-NMR (400 MHz, $CDCl_3$) δ 6.18-5.50 (m, 6H), 4.15 (s, 4H), 3.70 (s, 8H), 2.32 (s, 4H), 1.79-1.55 (m, 16H), 1.50-1.20 (m, 34H), 0.89 (s, 6H).

Polymer 21: To a solution of polymer 20 (1.2 grams, 1.4 millimoles) in THF (30 milliliters) was added aqueous potassium hydroxide (0.067 gram, 1.2 millimoles) dissolved in water (1 milliliter). Methanol (12 milliliters) was then added to this two-phase system to give a homogeneous solution. This mixture was then refluxed for 12 hours. The reaction mixture was evaporated to dryness and the residue was dissolved in water (20 milliliters) and then heated at reflux for another 24 hours. After cooling to room temperature, the reaction mixture was acidified with 2N HCl. The precipitate formed was collected by vacuum filtration and dried to afford polymer 21. Yield: 1.0 gram (90%). $^1$H-NMR (400 MHz, DMSO-d6) δ 11.95 (s, 2H), 6.20-5.50 (m, 6H), 3.70 (m, 8H), 2.28 (s, 4H), 1.79-1.55 (m, 16H), 1.50-1.20 (m, 28H), 0.84 (s, 6H).

Random copolymer RCP1: Polymer 21 ($M_n$=15,000, 234 milligrams, 1 equivalent) was dissolved in a solvent mixture of 2 milliliters of dry DMF and 20 milliliters of dry THF. To this solution, 0.12 milliliters of triethylamine (3 equivalents) was added. This mixture was kept in ice bath and stirred for 10 minutes. Ethyl chloroformate (ECF) (81 milligrams, 2.5 equivalents) was then added into the mixture in ice bath and stirred for 30 minutes. The reaction mixture was then removed from ice bath and stirred at room temperature for another 30 minutes. White precipitates were filtered and the filtrate was then added into a solution of 5-Amino-1H-benzotriazole (100 milligrams, 2.5 equivalents) in 10 milliliters of dry THF. This reaction mixture was further stirred for 30 hours. Solvents of the reaction mixture were then reduced by rotary evaporation until solution became viscous and polymer RCP1 was obtained by precipitation in distilled water. (224 milligrams, 74% yield). $^1$H-NMR (400 MHz, DMSO-d6) δ 8.38 (s, 2H), 7.97 (s, 2H), 7.48 (s, 2H), 7.32 (s, 2H), 6.50-5.70 (m, 6H), 3.75 (m, 8H), 2.28 (s, 4H), 1.79-1.55 (m, 16H), 1.50-1.20 (m, 28H), 0.86 (s, 6H).

Random copolymer RCP2: Polymer 21 (Mn=15K, 234 milligrams, 1 equivalent) was dissolved in a solvent mixture of 2 milliliters of dry DMF and 20 milliliters of dry THF. To this solution, 0.12 milliliter of triethylamine (3 equivalents) was added. This mixture was kept in ice bath and stirred for 10 minutes. Ethyl chloroformate (ECF) (81 milligrams, 2.5 equivalents) was then added into the mixture in ice bath and stirred for 30 minutes. The reaction mixture was then removed from ice bath and stirred at room temperature for another 30 minutes. White precipitates were filtered and the filtrate was then added into a solution of histamine (83 milligrams, 2.5 equivalents) in 5 milliliters of dry DMF. This reaction mixture was further stirred for 30 hours. Solvents of the reaction mixture were then reduced by rotary evaporation until solution became viscous and polymer RCP2 was obtained by precipitation in distilled water. (182 milligrams, 63% yield). $^1$H-NMR (400 MHz, DMSO-d6) δ 8.58 (s, 2H), 8.01 (s, 2H), 7.32 (s, 2H), 6.78-6.05 (m, 6H), 3.78 (m, 8H), 3.61 (s, 4H), 2.86 (s, 4H). 2.33 (s, 4H), 1.85-1.58 (m, 16H), 1.54-1.20 (m, 28H), 0.88 (s, 6H).

Proton Conductivity Experiments

These examples describe proton conductivity testing of polymer films prepared from proton transfer group-containing comb polymers with and without hydrophobic groups.

To determine proton-conductivity values, polymer films were drop-cast from solution onto a hole in a piece of Kapton polyimide tape and subsequently sandwiched between two electrodes to allow characterization by impedance spectroscopy as described in Granados-Focil, S., Woudenberg, R. C., Yavuzcetin, O., Tuominen, M. T., and Coughlin, E. B., "Water-free proton-conducting polysiloxanes: A study on the effect of heterocycle structure", *Macromolecules* 40, 8708-8713 (2007). The sample thickness and contact surface area were controlled by using a 125 micrometer thick Kapton polyimide sheet with a 0.3175 centimeter diameter hole. Polymers were dissolved in minimum amount of THF (with small amount of DMF in the case of control polymers) to make highly concentrated solutions. These solutions were then drop-cast into the hole of the Kapton sheet (supported by a gold-coated blocking electrode) to form the films Another gold-coated blocking electrode was then placed on top of the film and assembled to carry out the measurements. Electrochemical impedance data were obtained using a Solartron 1287 potentiostat and 1252 A frequency response analyzer in the 0.1 Hz-300 kHz range. Impedance spectra were collected during both heating (40, 80, 120, 160 and 200° C.) and cooling (200, 180, 160, 140, 120, 100, 80, 60 and 40° C.) cycles. High vacuum was applied through out the whole measurement and the miming time for one cycle was 16 hours. The data reported here are from the cooling cycles to minimize the effect of possible residual solvents in the films For each sample at a given temperature, the bulk proton conductivity was determined by fitting the impedance spectrum to an equivalent circuit model using Zview software. The data in a high frequency regime fit well to a parallel resistor-capacitor subcircuit, appearing as a semicircular impedance arc feature in a Nyquist plot (a parametric plot of the imaginary component of impedance, Z", versus the real component, Z'). The resistance determined by this fit correlates inversely to bulk proton conductivity of the material. Conductivity was computed as $\sigma=L/RA$, where L is the sample thickness (limited by the Kapton spacer) and A is the area of the sample disk.

Separate thermogravimetric analysis (TGA) was conducted to verify that all polymers reported in this study were thermally stable up to at least 200° C., which was the highest temperature investigated in impedance measurements. Conductivities of the polymer samples were measured through several heating/cooling cycles (40-200° C.) under high vacuum and were found to be consistent from cycle to cycle, eliminating any possible influence of residual solvent on the performance of these polymers.

Figure 6:
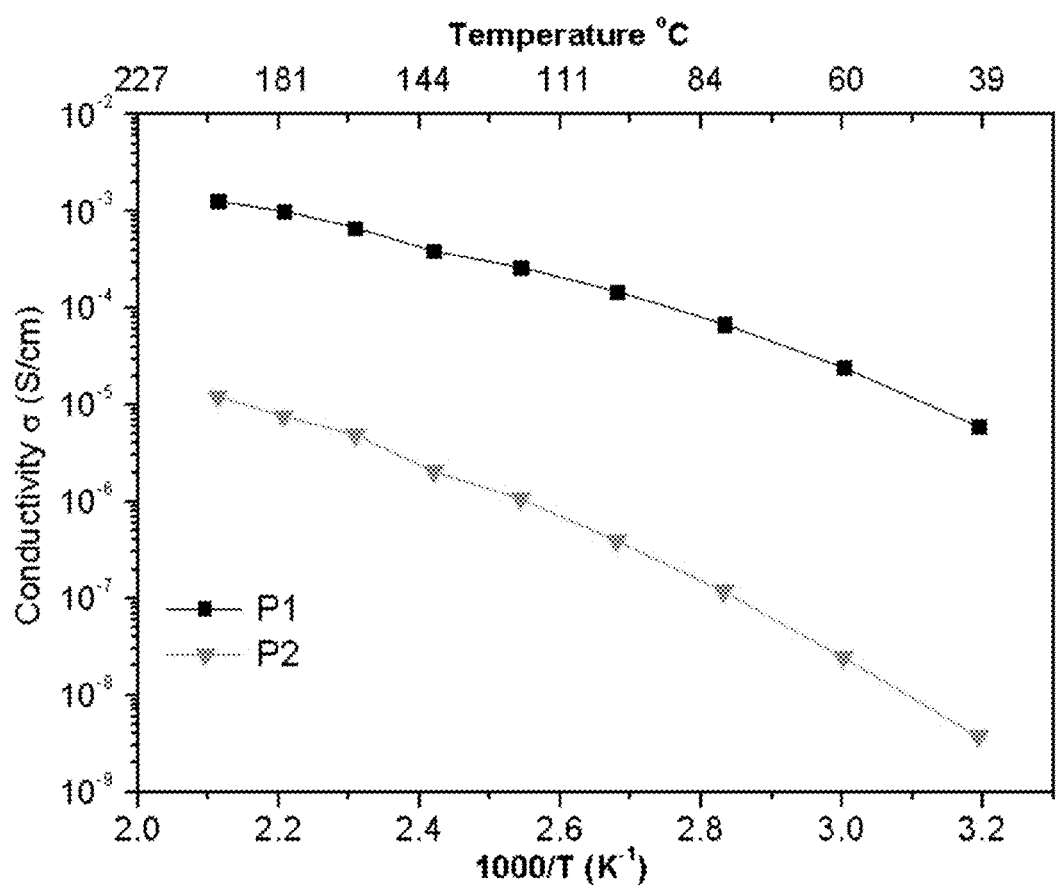
FIG. 6 is a plot of conductivity as a function of temperature for polymers P1 and P2.

Proton conductivities for benzotriazole-substituted polymers P1 (with hydrophobic groups) and P2 (without hydrophobic groups) measured as a function of temperature between 40 and 200° C. are shown in FIG. 6. Both polymers exhibit a qualitatively similar non-Arrhenius increase in conductivity with temperature that is typical for anhydrous proton-conducting polymers. However, the conductivity of P1 ranges from $6 \times 10^{-6}$ S/cm at ambient temperature to $1.3 \times 10^{-3}$ S/cm at 200° C., which is at least two orders of magnitude larger than the conductivity of P2 across the same temperature range, which varies from $4 \times 10^{-9}$ S/cm at ambient temperature to $1.2 \times 10^{-5}$ S/cm at 200° C. As a benchmark, Nafion membranes show room-temperature conductivities of $10^{-2}$-$10^{-1}$ S/cm when fully hydrated (M. C. Wintersgill, and J. J. Fontanella, "Complex impedance measurements in Nafion", *Electrochim. Acta.* 43, 1533-1538 (1998)), while at low humidity (below 5%), their conductivities have been reported as $10^{-7}$-$10^{-5}$ S/cm (E. H. Sanders, K. A. McGrady, G. E. Wnek, C. A. Edmondson, J. M. Mueller, J. J. Fontanella, S. Suarez, and S. G. Greenbaum, "Characterization of electrosprayed Nafion films", *J. Power Sources* 129, 55-61 (2004)). Under our experimental conditions, measured conductivities of Nafion were below the noise-floor of the measurements, which was about $10^{-9}$ S/cm. Thus, while the conductivities of our materials anhydrous conditions remain significantly below those of Nafion under fully hydrated conditions, the dramatic increase in conductivity from P2 to P1 suggests an important design principle for optimizing proton transport under anhydrous conditions.

Figure 7:
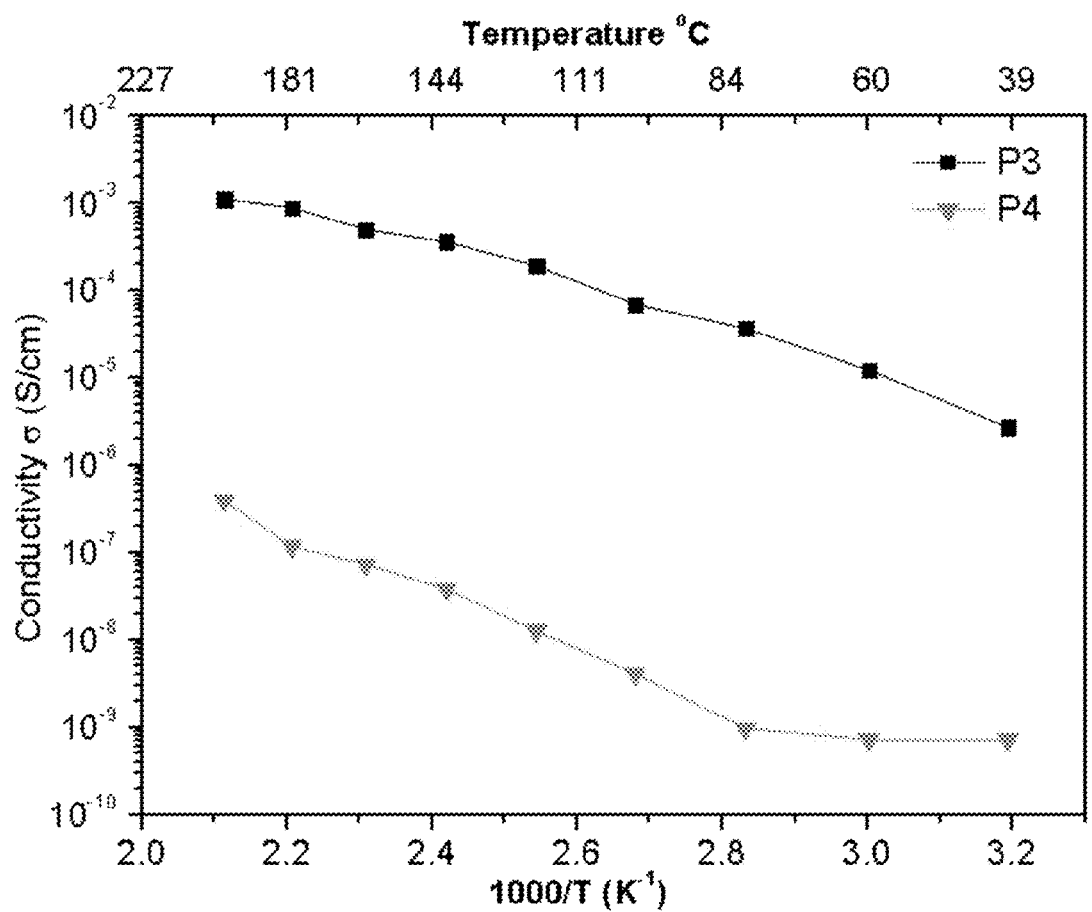
FIG. 7 is a plot of conductivity as a function of temperature for polymers P3 and P4.

To test the generality of our molecular design, we prepared polymers containing imidazole as a proton transporter functionality, which has also been shown to be capable of anhydrous proton transfer. See, e.g., K. D. Kreuer, A. Fuchs, M. Ise, M. Spaeth, and J. Maier, "Imidazole and pyrazole-based proton conducting polymers and liquids", *Electrochim. Acta.* 43, 1281-1288 (1998); G. Scharfenberger, W. H. Meyer, G. Wegner, M. Schuster, K. D. Kreuer, and J. Maier, "Anhydrous polymeric proton conductors based on imidazole functionalized polysiloxane" *Fuel Cells* 6, 237-250. (2006); Z. Zhou, S. W. Li, Y. L. Zhang, M. L. Liu, and W. Li, "Promotion of proton conduction in polymer electrolyte membranes by 1H-1,2,3-triazole", *J. Am. Chem. Soc.* 127, 10824-10825 (2005); and S. Granados-Focil, R. C. Woudenberg, O. Yavuzcetin, M. T. Tuominen, and E. B. Coughlin, "Water-free proton-conducting polysiloxanes: A study on the effect of heterocycle structure", *Macromolecules* 40, 8708-8713 (2007). Imidazole also has a very different $pK_a$ in the protonated form as compared to benzotriazole. By analogy to benzotriazole-substituted polymers P1 and P2, we synthesized imidazole-substituted polymers P3 and P4, and described above. AC impedance measurements revealed that polymer P3 bearing a decyl chain exhibits dramatically higher conductivity than the corresponding control polymer P4, in this case by more than three orders of magnitude (FIG. 7).

Figure 8:
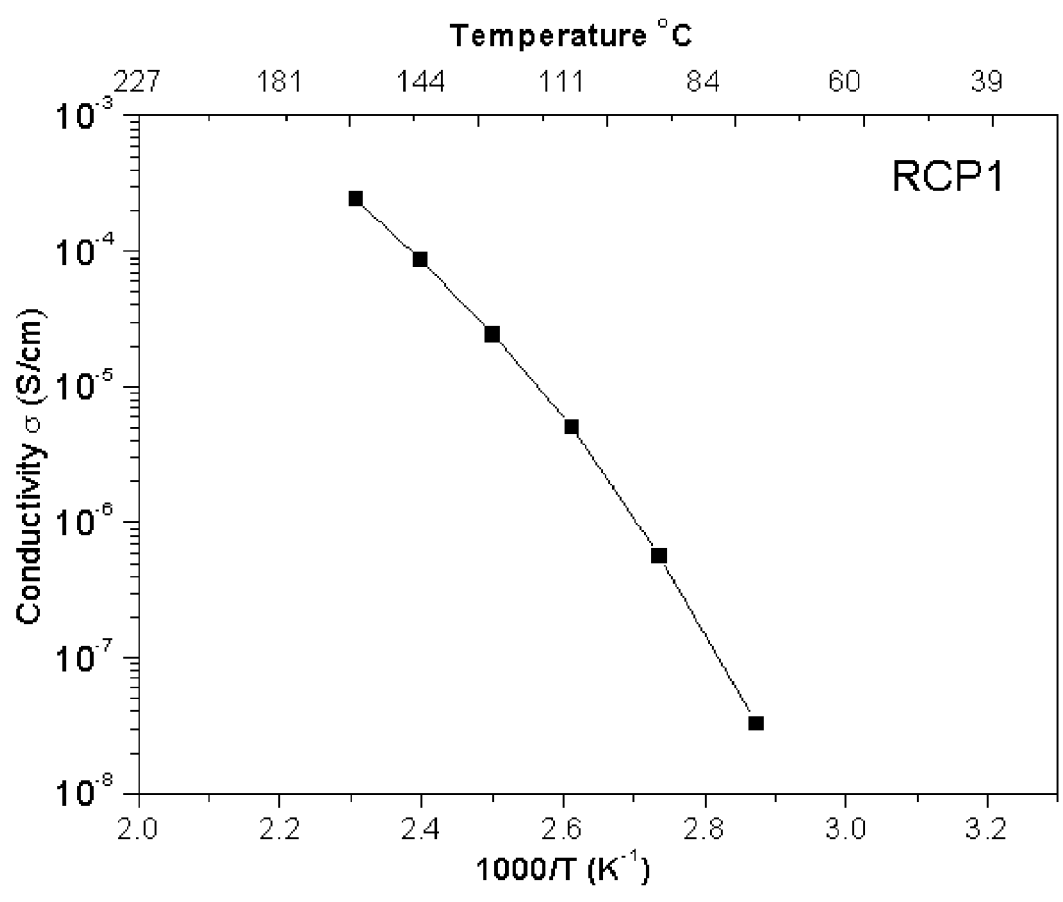
FIG. 8 is a plot of conductivity as a function of temperature for random copolymer RCP1.
Figure 9:
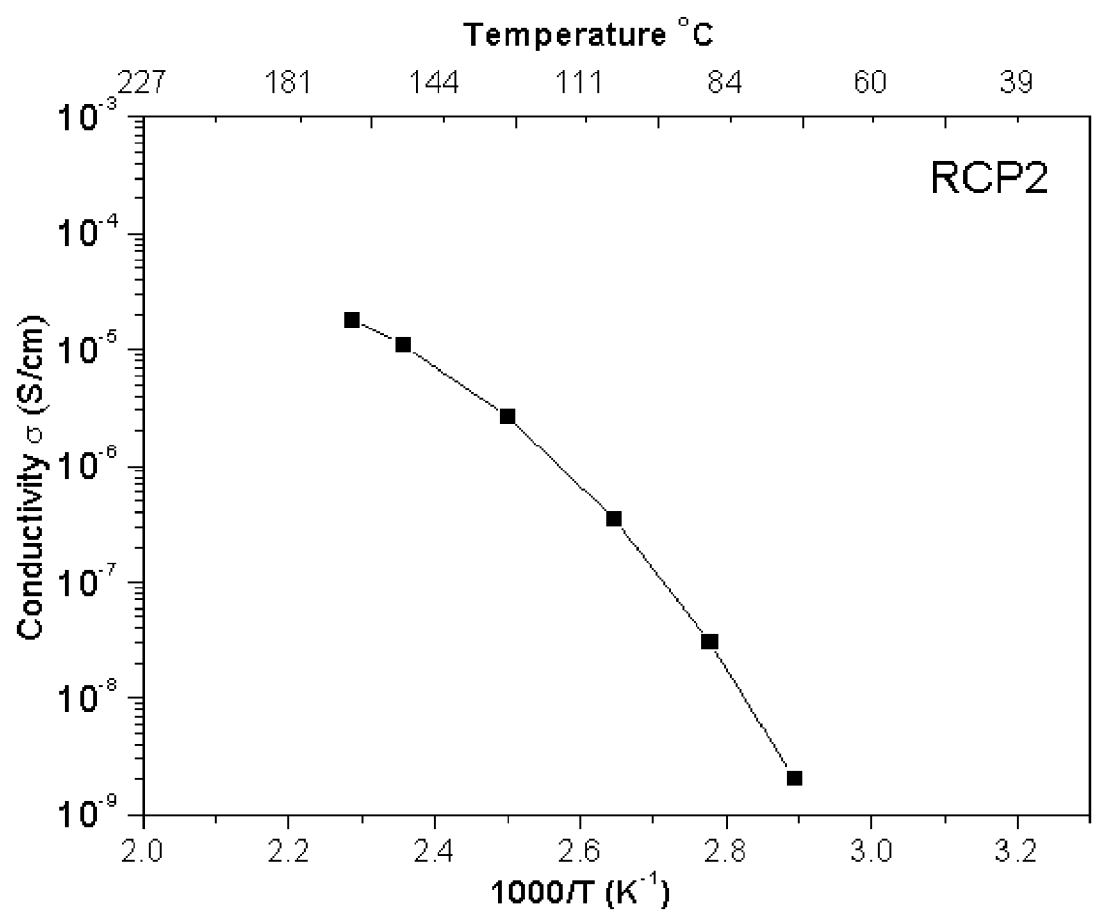
FIG. 9 is a plot of conductivity as a function of temperature for random copolymer RCP2.

In addition to testing pairs of polymers with and without decyl chains on each monomer, we also tested random copolymers synthesized from a monomer disubstituted with decyl groups and another monomer disubstituted with N-heterocycles, the monomers being mixed in a 1:1 molar ratio. Thus, RCP1 was a copolymer of a decyl disubstituted monomer and a benzotriazole-disubstituted monomer. And RCP2 was a copolymer of a decyl disubstituted monomer and an imidazole-disubstituted monomer. The conductivities of these random copolymers, shown in FIGS. 8 and 9, respectively, are significantly greater than those of the unorganized control homopolymers P2 and P4, though somewhat less than the comb polymers P1 and P3. These results further support the conclusion that nanoscale phase separation in these materials is directly tied to the efficiency of proton transport.

Small-Angle X-Ray Scattering Experiments

Given the chemical composition of the hydrophobic group, it may seem surprising that the addition of a decyl chain to each repeat unit of a polymer could boost proton conductivity by two orders of magnitude. After all, the average density of proton-transporting groups is lowered by the presence of the decyl chain: the benzotriazole unit makes up only 23 wt % of P1 as compared to 34 wt % of P2. While not wishing to be bound by any particular theory of operation, we hypothesize that the role of the decyl chain is to provide incompatibility in mixing with the amphoteric heterocycles that drives P1 to self-assemble and form nanoscale domains containing enhanced local concentrations of benzotriazole, thereby facilitating proton transport.

To test this hypothesis, we characterized the structures of these polymers using small-angle X-ray scattering (SAXS). SAXS experiments were conducted using an in-house setup from Molecular Metrology Inc. (presently sold as Rigaku S-Max3000). It uses a 30 watt microsource (Bede) with a $30 \times 30$ μm$^2$ spot size matched to a Maxflux® optical system (Osmic) leading to a low-divergence beam of monochromatic $CuK_\alpha$ radiation (wavelength $\lambda=0.154$ nm). After passing beam-defining and guard pinholes, the beam of about 0.4 millimeter diameter enters the sample chamber. Samples were placed within a hot stage connected to an Omega CN76000 temperature controller. The scattered intensity was collected by a two-dimensional gas-filled wire detector at a distance of about 1500 millimeters from the sample. A beamstop of 4 millimeters diameter in front of the detector has in its center a photodiode allowing monitoring the intensity of the direct beam. The whole system is evacuated. The angular range (determined by the radius of the beamstop and of the detector) covers a wave vector range of $0.06 < q < 1.6$ nanometer$^{-1}$, where $q=(4\pi/\lambda)\sin\theta$, with $2\theta$ being the scattering angle. The actual scattering angles are calibrated using the accurately known reflection from silver behenate.

Figure 10:
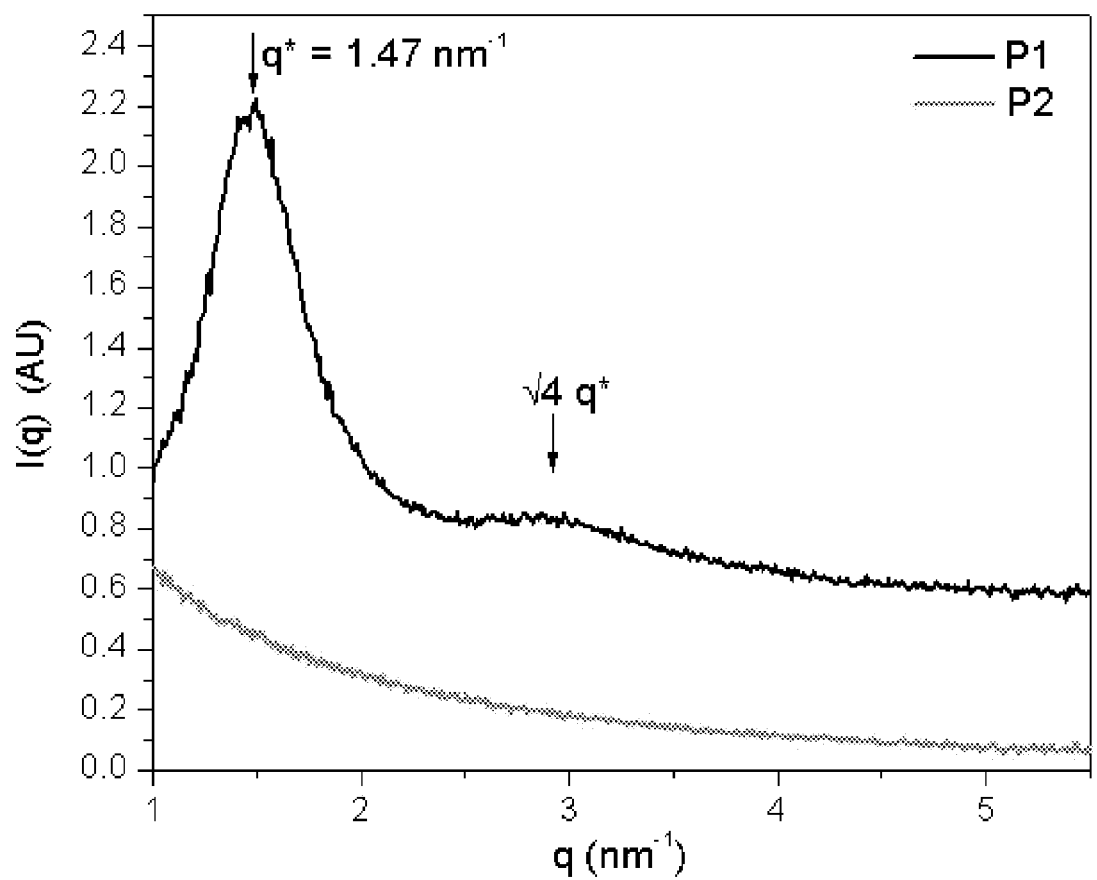
FIG. 10 is a plot of small-angle x-ray scattering data for polymers P1 and P2.

As shown in FIG. 10, polymer P1 at ambient temperature gives rise to scattering peaks indicative of self-assembled nano-structures, while the control polymer P2 at ambient temperature yields a completely featureless pattern indicative of a homogeneous phase-mixed structure. The first-order scattering peak from P1 falls at $q^*=1.47$ nanometer$^{-1}$, corresponding to a real-space distance of d=4.3 nanometers, and a faint though clearly resolvable second order peak occurs at $\sqrt{4}$ $q^*$. While the structure cannot be unambiguously be determined from these data, the presence of only a second-order peak suggests a lamellar structure with a repeat spacing of 4.3 nanometers. We estimate the fully stretched length of a monomer, from the tip of the decyl chain to the imidazole group, as about 3 nanometers, thus the observed repeat spacing is consistent with "back-to-back" stacking of polymer chains with some interdigitation of the decyl chains and/or benzotriazole group and spacer.

Figure 11:
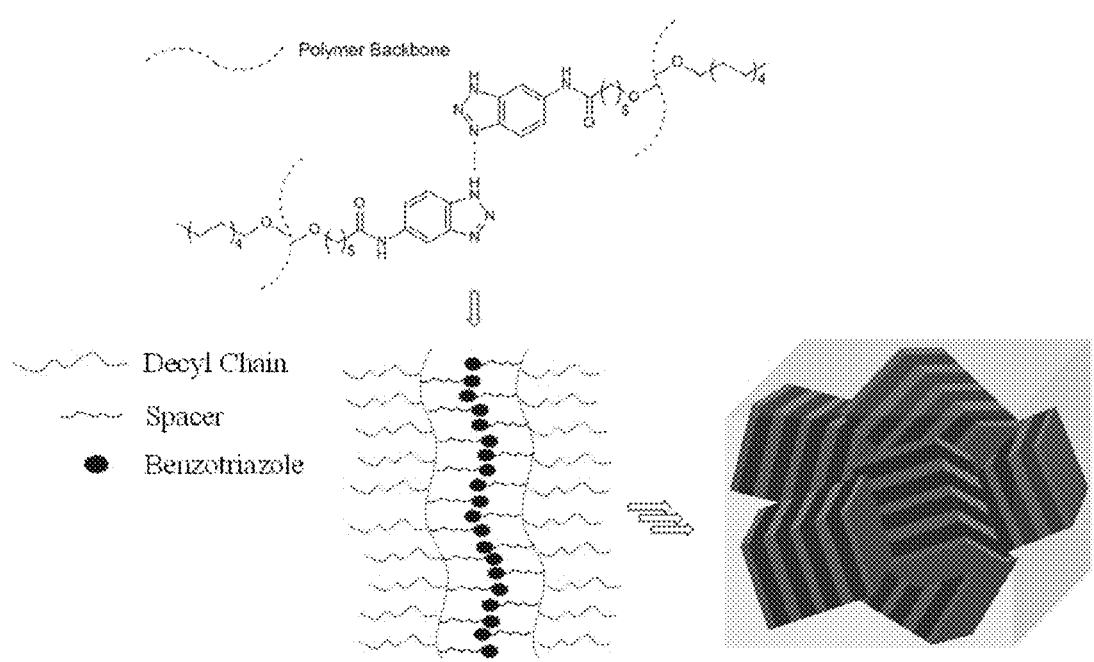
FIG. 11 is a schematic illustration of a possible phase-separated structure for polymer P1.

A schematic of this proposed structure is shown in FIG. 11, where two repeating units arranged with the benzotriazoles head-to-head would allow hydrogen bonding, while the alkyl groups point away from each other. Analysis of the first order peak reveals a width (FWHM, $\Delta q$) of 0.6 nanometer$^{-1}$ for polymer P1, yielding a correlation length of $2\pi/\Delta q \approx 10$ nanometers, indicating that the size of ordered domains is small, with positional correlations extending only over several repeat units. As demonstrated by Ikkala and co-workers (T. Ruotsalainen, M. Torkkeli, R. Serimaa, T. Mäkelä, R. Mäki-Ontto, J. Ruokolainen, G. Brinke, and O. Ikkala, "Structural hierarchy in flow-aligned hexagonally self-organized microphases with parallel polyelectrolytic structures", *Macromolecules* 36, 9437-9442 (2003)), self-assembly into anisotropic nanostructures will yield orientation-dependent conductivity, while McGrath and co-workers have shown that continuity of nanoscale domains is critical to efficient proton transport in sulfonated polymers (A. Roy, M. A. Hickner, X. Yu, Y. Li, T. E. Glass, and J. E. McGrath, "Influence of chemical composition and sequence length on the transport properties of proton exchange membranes", *J Polym Sci Part B: Polym Phys.* 44, 2226-2239 (2006)). In the case of our polymers, while the limited length-scales of ordering preclude any considerations of the effects of orientation or dimensionality of nano-scale domains on conductivity, the nano-scale organization provided by supramolecular assembly clearly enhances anhydrous proton conductivity by at least two orders of magnitude compared to the phase-mixed control polymer. The exact mechanism of enhancement is currently unclear. While not wishing to be bound by any particular theory of operation, we speculate that self-organization leads to interconnected channels of locally-enriched benzotriazole concentration that facilitate proton hopping through the membrane.

Figure 12:
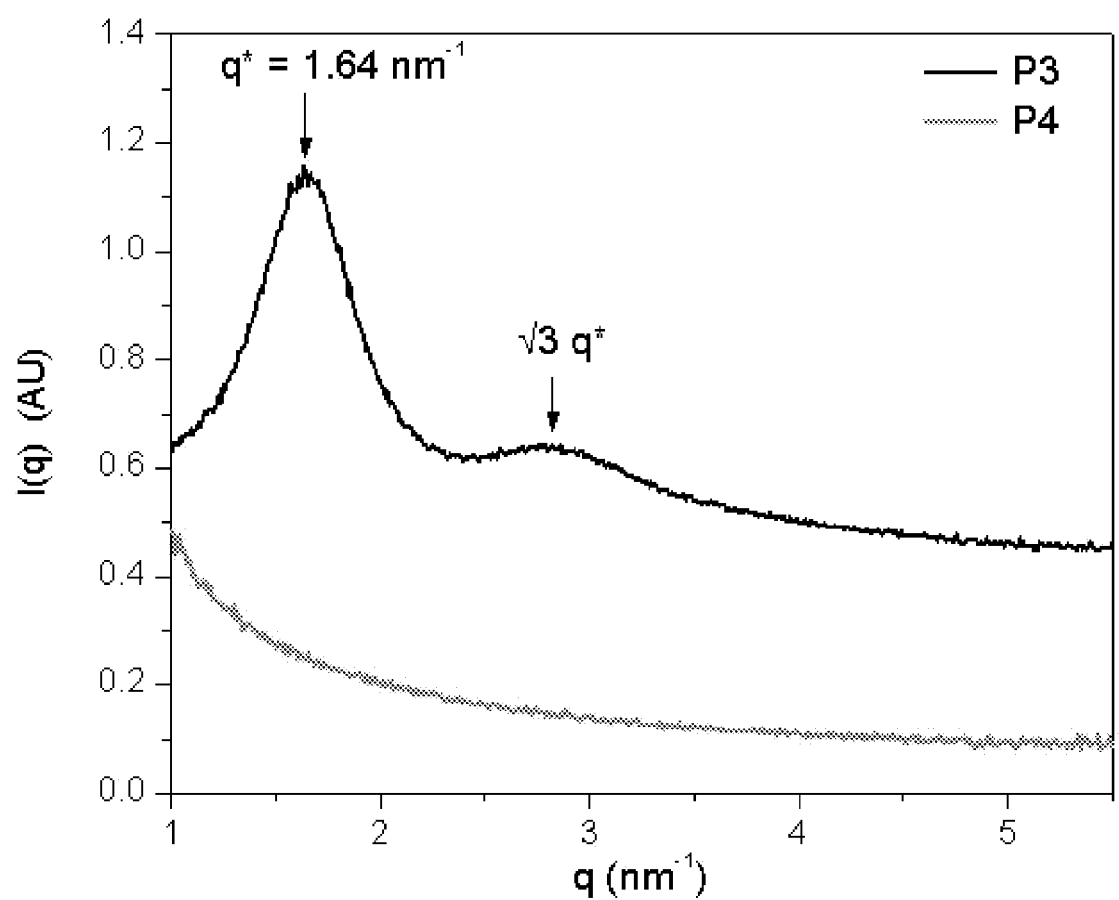
FIG. 12 is a plot of small-angle x-ray scattering data for polymers P3 and P4.
Figure 13:
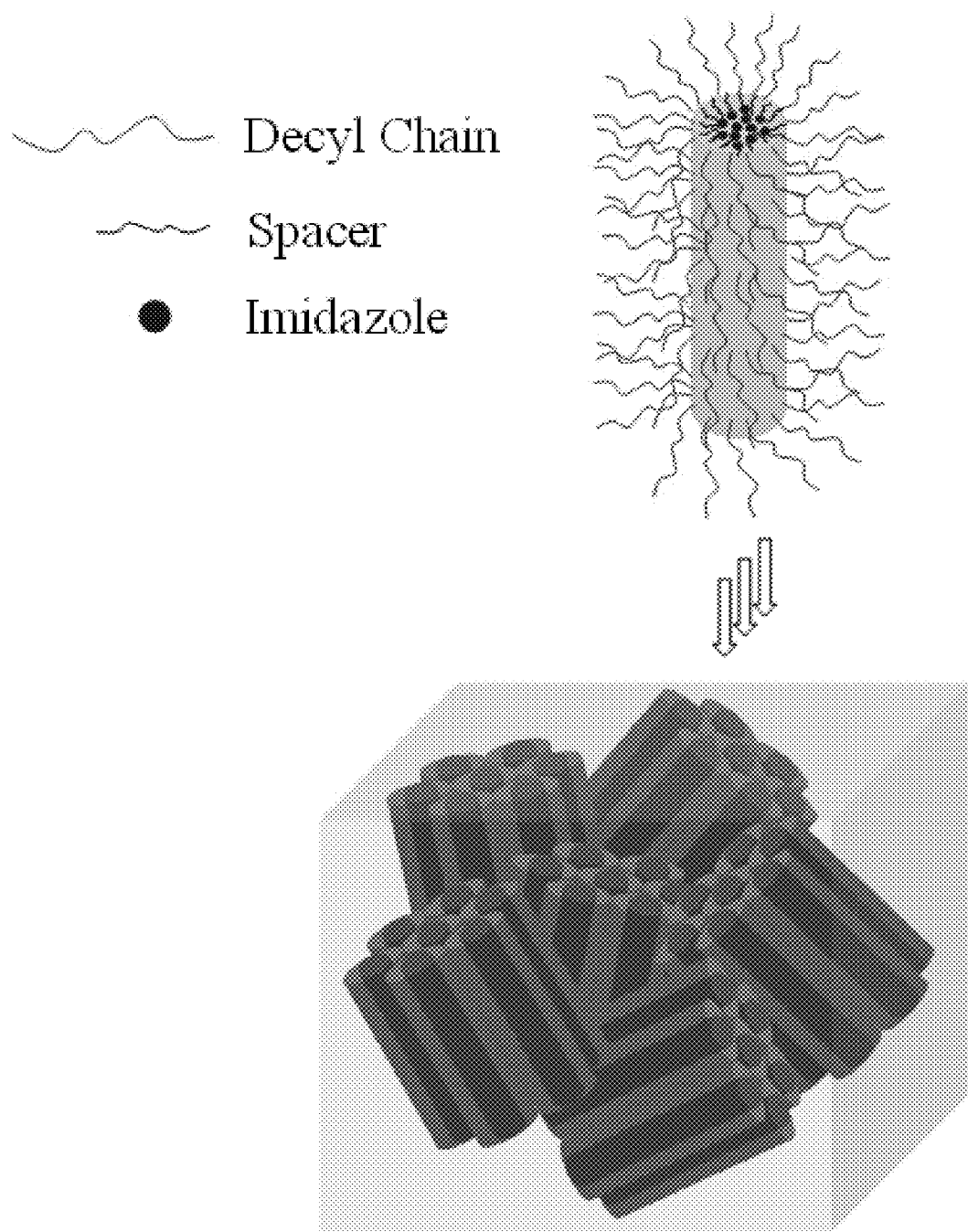
FIG. 13 is a schematic illustration of a possible phase-separated structure for polymer P3.

Investigation of the morphologies of the imidazole-substituted polymers P3 and P4 using SAXS revealed that P3 exhibits two well-defined scattering peaks indicating the presence of self-assembled nanostructures, while P4 shows no sign of organization (FIG. 12). Remarkably, the second scattering peak for P3 falls at a position of $\sqrt{3}$ q*, clearly indicating a non-lamellar structure, and suggesting a hexagonal symmetry, most likely corresponding to a structure of hexagonally-packed cylinders (FIG. 13).

To test for the possibility of disordering or nanoscale structural transitions at high temperature (which have been shown to yield dramatic changes in ionic conductivity in some cases; see B.-K. Cho, A. Jain, S. M. Gruner, and U. Wiesner, "Mesophase structure-mechanical and ionic transport correlations in extended amphiphilic dendrons", *Science* 305, 1598-1601 (2004)) we performed variable-temperature SAXS measurements on polymers P1 and P3 over the range of 40 to 200° C. While the intensity of the first-order scattering peak decreased continuously with increasing temperature, its position and width remained nearly constant, indicating that a similar level of nanoscale organization was present in these materials over the entire temperature range of interest.

Figure 14:
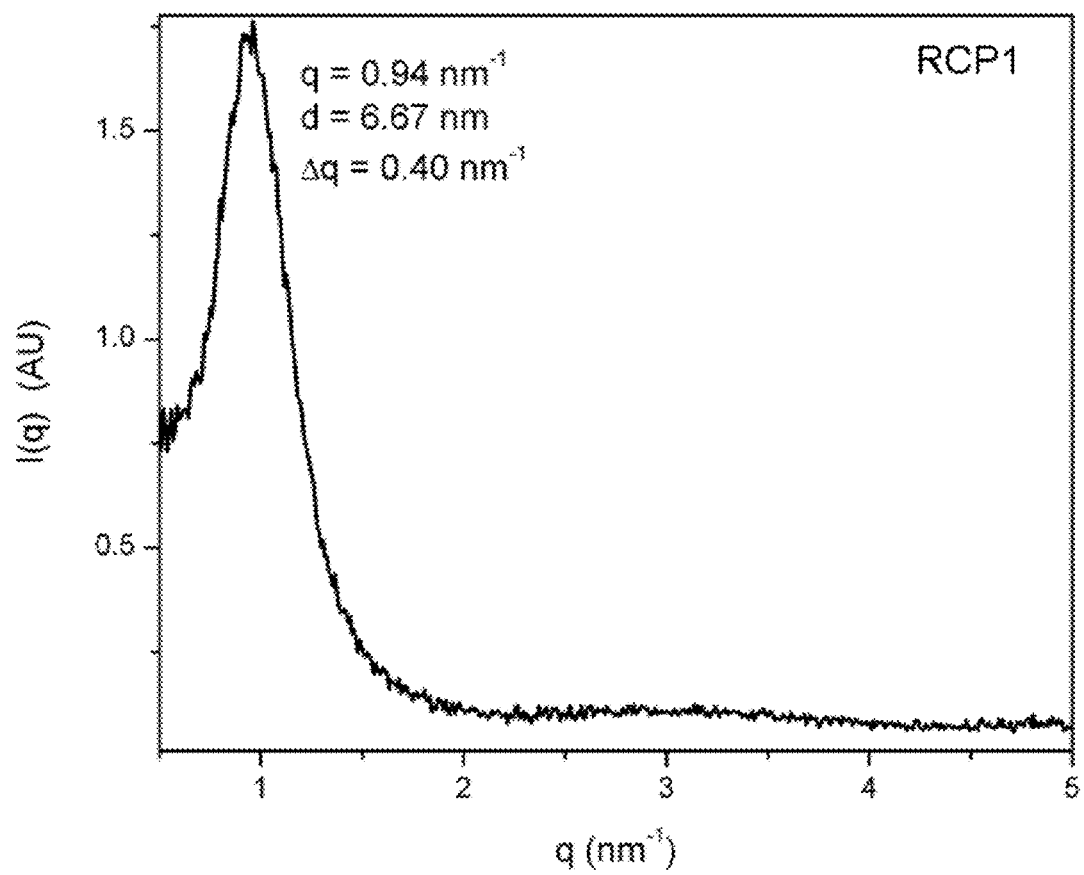
FIG. 14 is a plot of small-angle x-ray scattering data for random copolymer RCP1.
Figure 15:
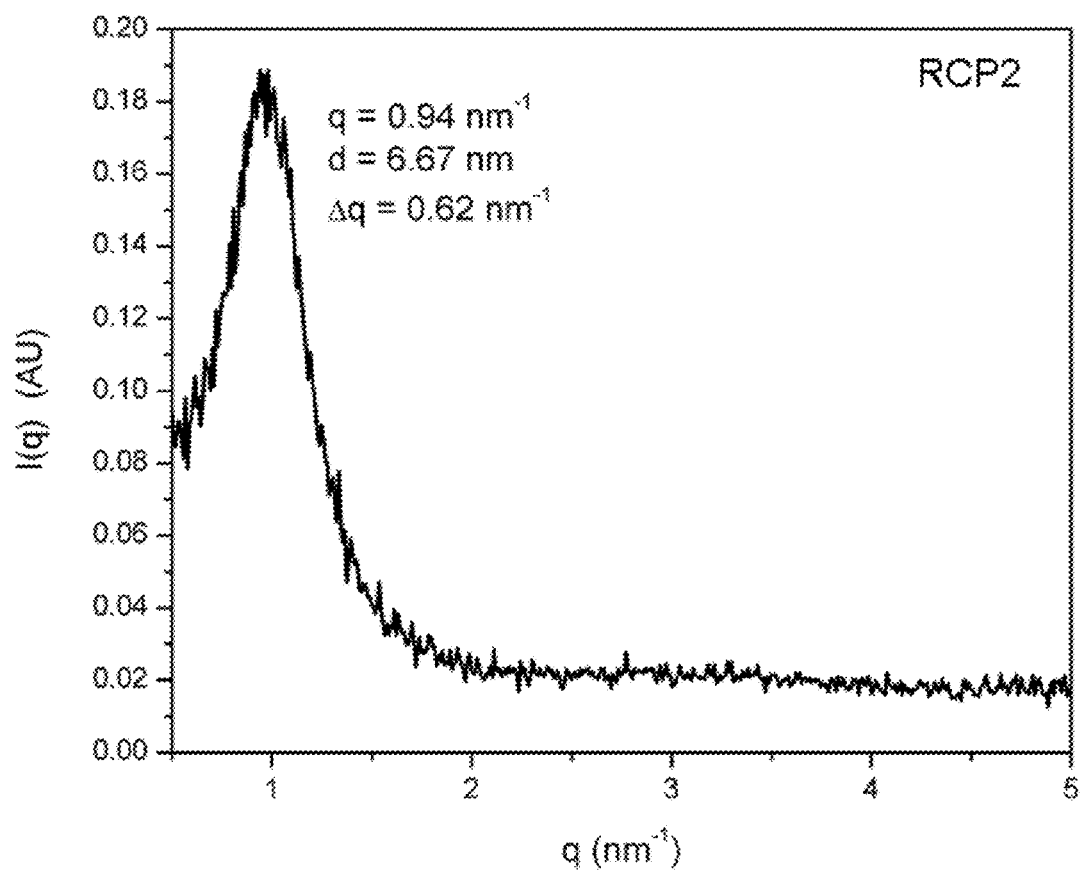
FIG. 15 is a plot of small-angle x-ray scattering data for random copolymer RCP2.

In addition to testing pairs of polymers with and without decyl chains on each monomer, we also tested the random copolymers RCP1 and RCP2. As shown in FIGS. 14 and 15, these random copolymers exhibited some extent of nanoscale phase separation, but with more poorly-organized nanostructures than the comb polymers as revealed by the presence of only a single scattering peak for each.

Differential Scanning Calorimetry Experiments

An additional factor to consider when comparing the proton conductivity of two polymer chains bearing the same functional group is the glass transition temperature ($T_g$), since the mobility of the polymer chain is well known to influence the rate of proton transport. See, e.g., M. F. H. Schuster, and W. H. Meyer, "Anhydrous proton-conducting polymers", *Annu. Rev. Mater. Res.* 33, 233-261 (2003). In order to test whether the difference in conductivity observed between P1 and P2 simply reflects a decrease in $T_g$ due to the presence of the decyl chain, we carried out differential scanning calorimetry experiments.

Differential scanning calorimetry (DSC) employed a TA instruments Dupont DSC 2910. Samples were analyzed with a heating rate of 10° C./min from 0° C. to 150° C. under a flow of nitrogen (50 milliliters/minute).

As summarized in Table 1, the $T_g$ values of P1 and P2 were 55 and 67° C. respectively. The modest difference in $T_g$ between these polymers suggests that the mobility of the polymer backbone is not a major factor in the difference in the proton conductivities observed.

$T_g$ values determined for imidazole-substituted polymers P3 and P4 are also very similar, once again indicating that mobility of the polymer backbone is not a significant factor in the three order of magnitude difference in proton conductivity.

TABLE 1

Glass transition temperatures, decomposition onset temperatures, N-heterocycle weight fractions and polystyrene-equivalent molecular weights of polymers.

| Polymer | Decomposition Onset (° C.) (5% weight lost) | $T_g$ (° C.) | N-heterocycle Weight Fraction (%) | Molecular Weight ($M_n$) |
|---|---|---|---|---|
| P1 | 218 | 55 | 23 | 25 kg/mol |
| P2 | 233 | 67 | 34 | 25 kg/mol |
| P3 | 225 | 61 | 14 | 23 kg/mol |
| P4 | 221 | 71 | 20 | 24 kg/mol |

The experiments above collectively demonstrate the design, synthesis, and characterization of comb polymers useful for anhydrous proton transport. We have shown that: (i) comb polymers containing phase-incompatible substituents in the monomer units provide ordered nanostructures through self-assembly in the melt state; (ii) polymers in which monomer units contain a non-conducting hydrophobic (e.g., decyl) group and a proton-conducting group (e.g., benzotriazole or imidazole) exhibit two to three orders of magnitude higher conductivity than polymers that contain only the proton-conducting group, despite the lower overall content of proton-conducting groups in the former; (iii) polymer backbone mobility is not a major contributor to the observed differences in proton conductivity in these systems; (iv) the high conductivities observed for the polymers with hydrophobic substituents are correlated with the ability to form organized nanostructures consisting of domains with locally high concentrations of proton-conducting groups that facilitate transport; (v) this molecular design strategy works for two proton-conducting groups with substantially different $pK_a$ values (i.e., benzotriazole and imidazole), suggesting that the importance of nanochannel formation in proton conduction is a general phenomenon. Our work here indicates that careful considerations of polymer architecture and nanoscale morphology are key elements in the design of efficient anhydrous proton exchange membranes.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A polymer, comprising:
   a plurality of repeating units;
   wherein each repeating unit comprises
   a monovalent pendent hydrophobic group comprising about 5 to about 20 carbon atoms, and
   a pendent proton transfer group bound to the repeating unit via a linking group; wherein the pendent proton transfer group is selected from the group consisting of

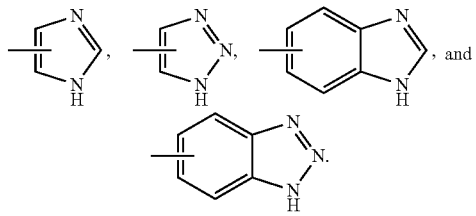

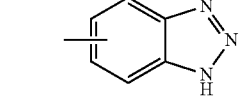

2. The polymer of claim 1, wherein the pendent hydrophobic group is selected from the group consisting of $C_5$-$C_{20}$ hydrocarbyl, $C_5$-$C_{20}$ hydrocarbyloxyl, $C_5$-$C_{20}$ partially fluorinated hydrocarbyl, $C_5$-$C_{20}$ partially fluorinated hydrocarbyloxyl, $C_5$-$C_{20}$ perfluorinated hydrocarbyl, and $C_5$-$C_{20}$ perfluorinated hydrocarbyloxyl.

3. The polymer of claim 1, wherein the pendent hydrophobic group is $C_5$-$C_{20}$ perfluorinated hydrocarbyl.

4. The polymer of claim 1, wherein the pendent proton transfer group is

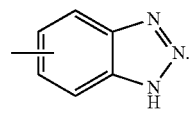

5. The polymer of claim 1, wherein the linking group is a divalent group comprising about 3 to about 10 aliphatic carbon atoms.

6. The polymer of claim 1, wherein the repeating units have the structure

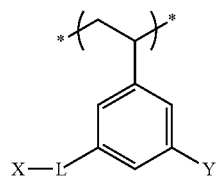

wherein X is the pendent proton transfer group, L is the linking group, and Y is the pendent hydrophobic group.

7. The polymer of claim 1, wherein the repeating units have a structure selected from the group consisting of

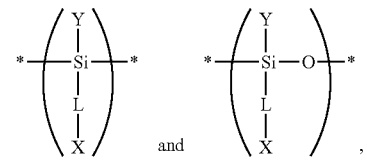

wherein X is the pendent proton transfer group, L is the linking group, and Y is the pendent hydrophobic group.

8. The polymer of claim 1, wherein the repeating units have a structure selected from the group consisting of

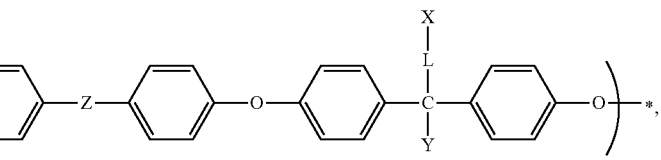

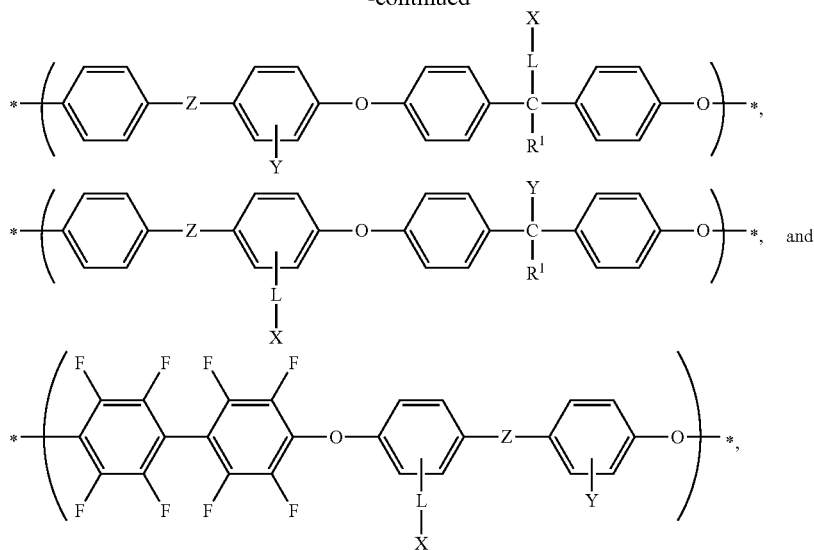

wherein X is the pendent proton transfer group, L is the linking group, Y is the pendent hydrophobic group, Z is —C(=O)— or —S(=O)$_2$—, and R$^1$ is selected from the group consisting of hydrogen and C$_1$-C$_6$ alkyl.

9. The polymer of claim 1, wherein the repeating units have the structure

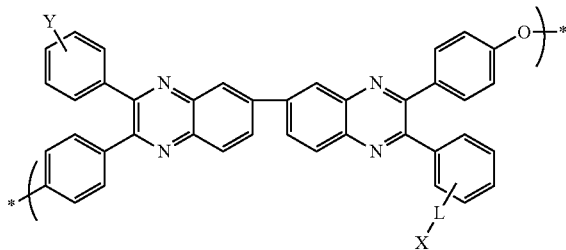

wherein X is the pendent proton transfer group, L is the linking group, and Y is the pendent hydrophobic group.

10. The polymer of claim 1, wherein the repeating units have a structure selected from the group consisting of

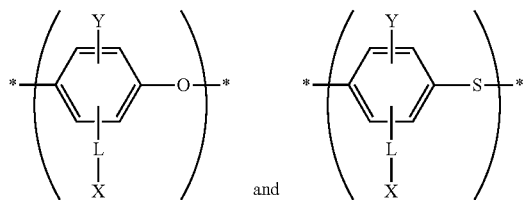

wherein X is the pendent proton transfer group, L is the linking group, and Y is the pendent hydrophobic group.

11. The polymer of claim 1, wherein the repeating units have a structure selected from the group consisting of

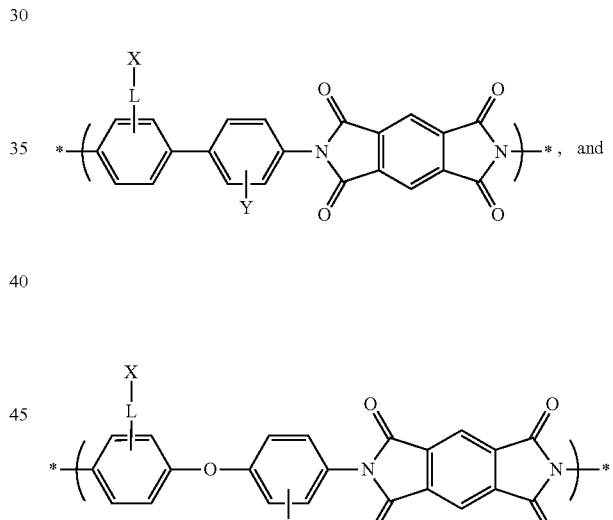

wherein X is the pendent proton transfer group, L is the linking group, and Y is the pendent hydrophobic group.

12. The polymer of claim 1, wherein the repeating units have a structure selected from the group consisting of

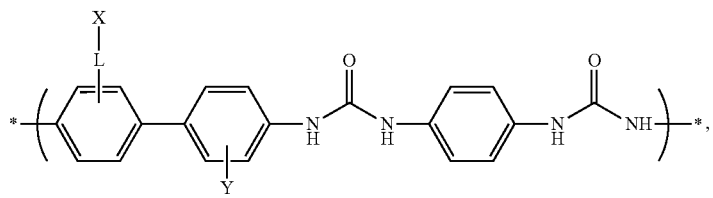

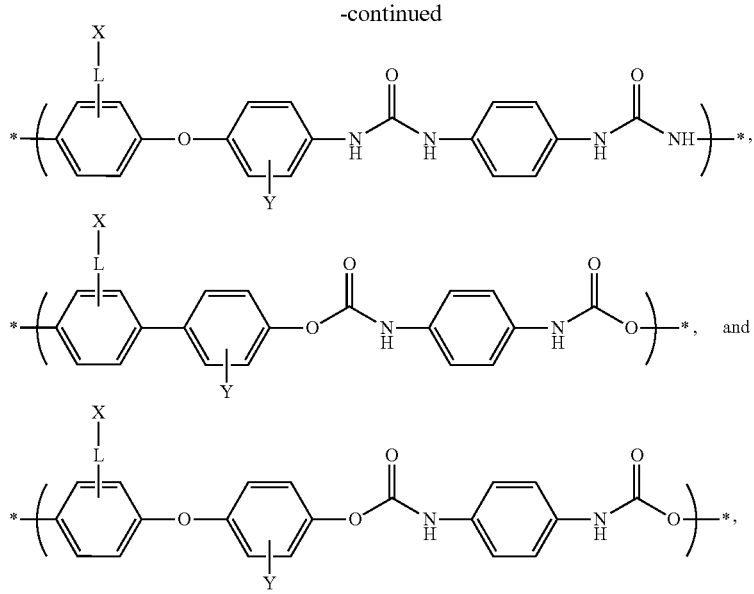

wherein X is the pendent proton transfer group, L is the linking group, and Y is the pendent hydrophobic group.

13. A polymer, comprising:
a plurality of repeating units;
wherein each repeating unit comprises
a pendent hydrophobic group, and
a pendent proton transfer group bound to the repeating unit via a linking group;
wherein the repeating units are selected from the group consisting of

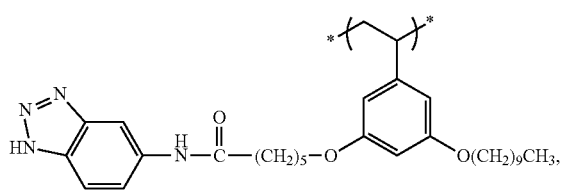

-continued

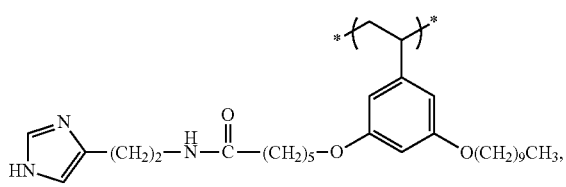

and combinations thereof.

14. A proton exchange membrane comprising the polymer of claim 1.

15. A fuel cell comprising the proton exchange membrane of claim 14

* * * * *